(12) United States Patent
Aoki et al.

(10) Patent No.: US 7,142,858 B2
(45) Date of Patent: Nov. 28, 2006

(54) MOBILE RADIO COMMUNICATION SYSTEM AND METHOD OF REGISTERING POSITION THEREIN

(75) Inventors: Nobuhisa Aoki, Kawasaki (JP); Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 10/733,188

(22) Filed: Dec. 11, 2003

(65) Prior Publication Data

US 2004/0121769 A1    Jun. 24, 2004

Related U.S. Application Data

(63) Continuation of application No. PCT/JP01/05100, filed on Jun. 15, 2001.

(51) Int. Cl.
*H04Q 7/20* (2006.01)

(52) U.S. Cl. ............... 455/436; 455/435.1; 455/446

(58) Field of Classification Search ............. 455/435.1, 455/446, 436

See application file for complete search history.

(56) References Cited

U.S. PATENT DOCUMENTS

| | | | | |
|---|---|---|---|---|
| 5,581,595 A | * | 12/1996 | Iwashita et al. | 455/564 |
| 5,732,326 A | * | 3/1998 | Maruyama et al. | 455/66.1 |
| 5,832,363 A | * | 11/1998 | Moriya et al. | 455/11.1 |

FOREIGN PATENT DOCUMENTS

| | | |
|---|---|---|
| JP | 4-220821 | 8/1992 |
| JP | 4-249925 | 9/1992 |
| JP | 6-319168 | 11/1994 |
| JP | 2001-119742 | 4/2001 |
| JP | 2001-141487 | 5/2001 |

\* cited by examiner

*Primary Examiner*—Joseph Field
*Assistant Examiner*—S. Smith
(74) *Attorney, Agent, or Firm*—Katten Muchin Rosenman LLP

(57) ABSTRACT

Disclosed is a mobile radio communication system in which a position registration area number is reported from a base station to a mobile station within a radio zone, position information indicating a position registration area in which a mobile station resides is registered in storage means based upon position registration information that has been transmitted from the mobile station, and when there is an incoming call to a mobile station, a paging call is placed from a plurality of base stations within the position registration area, in which the base station resides, based upon position information that has been read out of the memory means. Updating of the position registration area of a mobile station can be performed automatically on the network side without the mobile station transmitting position registration information to the network side. To achieve this, a rule for predicting the manner in which a mobile station will change a position registration area by moving is registered beforehand on the network side. Whether a state in which the rule is applicable has been attained is checked for every mobile station. If such a state is attained, the position registration area of the mobile station is updated based upon the rule.

13 Claims, 35 Drawing Sheets

FIG. 4

POSITION REGISTRATION AREA AND RADIO ZONE NO.

| POSITION REGISTRATION AREA ID | RADIO ZONE IDs |
|---|---|
| L1 | C1, C2, C3, C4, C5, C6, C7 |
| L2 | C8, C19, C20, · · · |
| L3 | C21, C22, C23, · · · |
| L4 | C24, C25, · · · |
| L5 | C14, C26, C27, · · · |
| L6 | C28, C29, C30, · · · |
| L7 | C31, C32, · · · |

FIG. 6

RULE FOR AUTOMATIC POSITION REGISTRATION CHANGEOVER

RULE CONFIRMATION PORTION

| RADIO ZONE ID | TRAVEL TIME | |
|---|---|---|
| C2→C8 | tM11~tM12 | } RL1 |
| C5→C14 | tM21~tM22 | } RL2 |

CHANGEOVER RULE PORTION

| POSITION REGISTRATION AREA ID | CHANGEOVER TIME | |
|---|---|---|
| L2 | t21~t22 | |
| L3 | t31~t32 | } RL1 |
| L4 | t41~t42 | |
| L5 | t51~t52 | |
| L6 | t61~t62 | } RL2 |
| L7 | t71~t72 | |

FIG. 7

| RULE NO. | RULE CONFIRMATION PORTION | | | CHANGEOVER RULE PORTION | | |
|---|---|---|---|---|---|---|
| | RADIO ZONE ID | TRAVEL TIME MINIMUM VALUE | TRAVEL TIME MAXIMUM VALUE | POSITION REGISTRATION AREA ID | CHANGEOVER TIME MINIMUM VALUE | CHANGEOVER TIME MAXIMUM VALUE |
| 1 | C2→C8 | tM11 | tM12 | L2 | t21 | t22 |
| | | | | L3 | t31 | t32 |
| | | | | L4 | t41 | t42 |
| 2 | C5→C14 | tM21 | tM22 | L5 | t51 | t52 |
| | | | | L6 | t61 | t62 |
| | | | | L7 | t71 | t72 |

(1: Rule No., 2: Rule Confirmation Portion, 3: Changeover Rule Portion; RL1 covers rows L2–L4, RL2 covers rows L5–L7)

FIG. 8

NOTIFICATION INFORMATION

| INFORMATION ELEMENT |
|---|
| MESSAGE TYPE |
| NETWORK NO. |
| STIPULATION INFORMATION |
| CONTROL CHANNEL STRUCTURE INFORMATION |
| MOBILE STATION TRANSMISSION POWER DESIGNATION |
| STANDBY PERMISSION LEVEL |
| STANDBY DETERIORATION LEVEL |
| POSITION REGISTRATION AREA MULTIPLEX NUMBER (N) |
| POSITION NO. |
| ~ |
| POSITION NO. |
| MAXIMUM REPORTED NUMBER OF CHANNELS |
| NUMBER (M) OF PERCH CHANNELS FOR RESIDENCE ZONE / SECTOR DETERMINATION |
| PERCH CHANNEL NO. |
| ~ |
| PERCH CHANNEL NO. |
| POSITION REGISTRATION TIMER |
| EXTENSION INFORMATION ELEMENT LENGTH (K) |
| EXTENSION INFORMATION ELEMENT (RULE FOR AUTOMATIC POSITION REGISTRATION CHANGEOVER) |

RL

| | | |
|---|---|---|
| RULE FORMAT NO. | | |
| RULE FORMAT | | |
| NUMBER OF RULES | | |
| RULE NO. | | *3 |
| RADIO ZONE ID | | *3 |
| TRAVEL TIME (MINIMUM VALUE) | | *3 |
| TRAVEL TIME (MAXIMUM VALUE) | | *3 |
| NUMBER OF POSITION REGISTRATION AREA IDs | *2 | *3 |
| POSITION REGISTRATION AREA ID | *1 *2 | *3 |
| CHANGEOVER TIME (MINIMUM VALUE) | *1 *2 | *3 |
| CHANGEOVER TIME (MAXIMUM VALUE) | *1 *2 | *3 |

*1 REPEAT BY NUMBER OF POSITION REGISTRATION IDs
*2 REPEAT BY NUMBER OF RULES
*3 REPEAT BY NUMBER OF RULE FORMATS

FIG. 12

| RULE NUMBER | RULE CONFIRMATION PORTION | | | CHANGEOVER RULE PORTION | | |
|---|---|---|---|---|---|---|
| | RADIO ZONE ID | TRAVEL TIME | | POSITION REGISTRATION AREA ID | CHANGEOVER TIME | |
| | | MINIMUM VALUE | MAXIMUM VALUE | | MINIMUM VALUE | MAXIMUM VALUE |
| 1 | C2→C8 | tM11 | tM12 | L2 | t21 | t22 |
| | | | | L3 | t31 | t32 |
| | | | | L4 | t41 | t42 |
| 2 | C5→C14 | tM21 | tM22 | L5 | t51 | t52 |
| | | | | L6 | t61 | t62 |
| | | | | L7 | t71 | t72 |
| 3 | C2→C8 | tM31 | tM32 | L2 | t81 | t82 |
| | | | | L3 | t91 | t92 |
| | | | | L4 | t101 | t102 |
| 4 | C5→C14 | tM41 | tM42 | L5 | t111 | t112 |
| | | | | L6 | t121 | t122 |
| | | | | L7 | t131 | t132 |

FIG. 14

RULE CONFIRMATION PORTION

| RADIO ZONE ID | TRAVEL TIME |
|---|---|
| C33→C34 | tM51~tM52 |

CHANGEOVER RULE PORTION

| POSITION REGISTRATION AREA ID | CHANGEOVER TIME |
|---|---|
| L8 | t261~t262 |
| L9 | t271~t272 |
| L10 | t281~t282 |

FIG. 16

RULE CONFIRMATION PORTION 2

| RADIO ZONE ID | TRAVEL TIME |
|---|---|
| 1→3 | NONE |
| 1→4 | NONE |
| 2→3 | NONE |
| 5→4 | NONE |

RULE CHANGEOVER PORTION 3

| POSITION REGISTRATION AREA ID | CHANGEOVER TIME |
|---|---|
| L5 | t21~t22 |

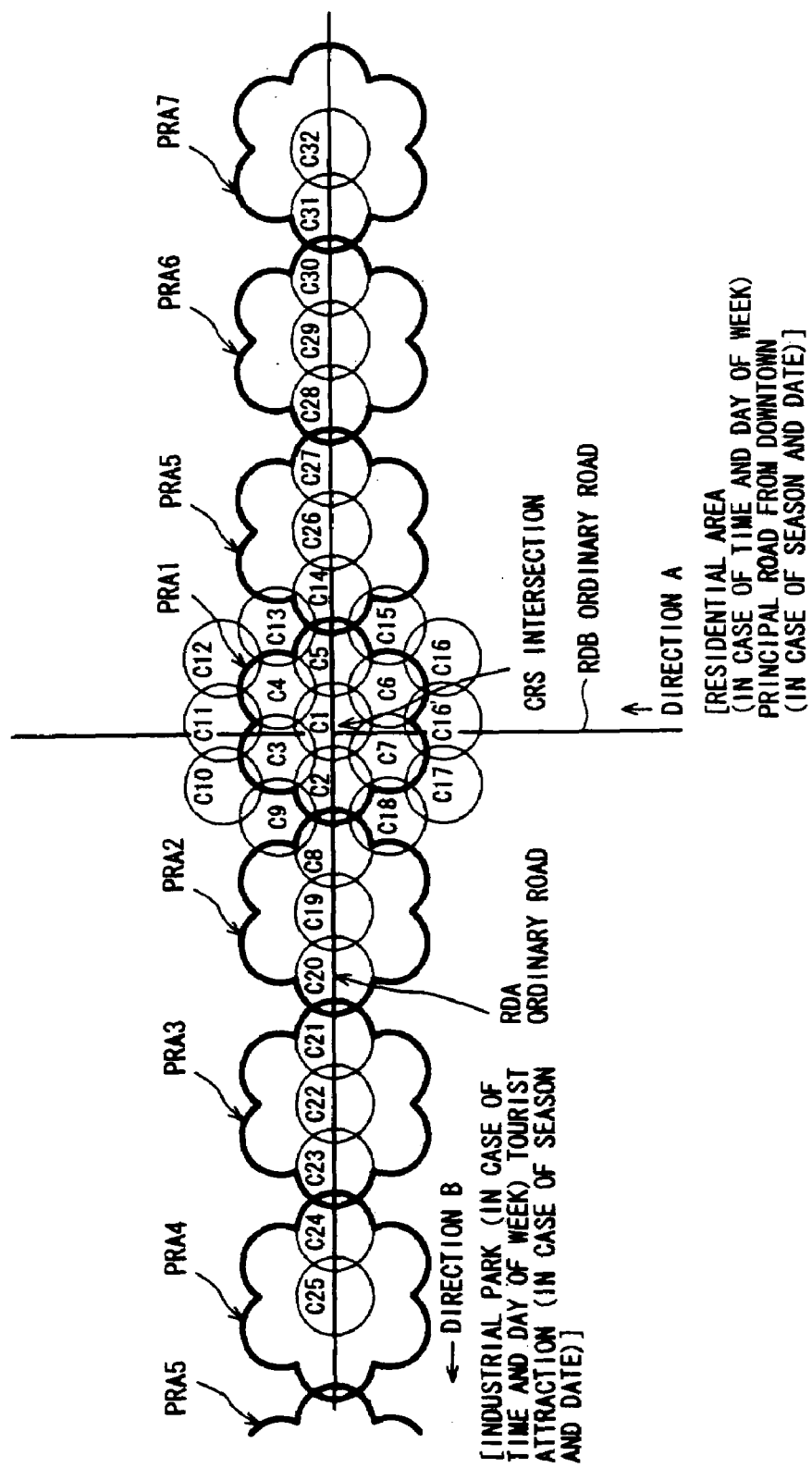

RULE FOR AUTOMATIC POSITION
REGISTRATION CHANGEOVER
(WEEKDAYS, 7:30 TO 8:30 AM)

| RADIO ZONE ID | TRAVEL TIME |
|---|---|
| C2→C8 | tM11~tM12 |

| POSITION REGISTRATION AREA ID | CHANGEOVER TIME |
|---|---|
| L2 | t21~t22 |
| L3 | t31~t32 |
| L4 | t41~t42 |

(b)

RULE FOR AUTOMATIC POSITION
REGISTRATION CHANGEOVER
(WEEKDAYS AND OTHER TIME PERIODS)

| RADIO ZONE ID | TRAVEL TIME |
|---|---|
| C2→C8 | tM11'~tM12' |

| POSITION REGISTRATION AREA ID | CHANGEOVER TIME |
|---|---|
| L2 | t21'~t22' |
| L3 | t31'~t32' |
| L4 | t41'~t42' |

FIG. 20

| LOCATION/FACILITY | RADIO ZONE ID |
|---|---|
| TOKYO △△ HEAD OFFICE | C11 |
| . . . . | . . . . |
| . . . . | . . . . |
| KAWASAKI △△ FACTORY | C21 |
| . . . . | . . . . |
| YOKOHAMA △△ BRANCH | C31 |
| . . . . | . . . . |

FIG. 21

| SCHEDULE BOOK ||
|---|---|
| LOCATION/ FACILITY OF PLANNED STAY | PLANNED DURATION OF STAY (DEPARTURE TIME) |
| TOKYO △△ HEAD OFFICE | |
| KAWASAKI △△ FACTORY | |
| YOKOHAMA △△ BRANCH | |

FIG. 22

| LOCATION/FACILITY | RADIO ZONE | PLANNED TIME OF STAY |
|---|---|---|
| TOKYO △△ HEAD OFFICE | C11 | |
| KAWASAKI △△ FACTORY | C21 | |
| YOKOHAMA △△ BRANCH | C31 | |

FIG. 23

| RULE NO. | RULE CONFIRMATION PORTION | CHANGEOVER RULE PORTION | | |
|---|---|---|---|---|
| | | LATITUDE-LONGITUDE INFORMATION | PASS-BY TIME | |
| | | | MINIMUM VALUE | MAXIMUM VALUE |
| 1 | NONE | e1-n1 | t141 | t142 |
| | | e2-n2 | t151 | t152 |
| | | e3-n3 | t161 | t162 |
| | | e4-n4 | t171 | t172 |
| | | e5-n5 | t181 | t182 |
| | | e6-n6 | t191 | t192 |
| 2 | NONE | e7-n7 | t201 | t202 |
| | | e8-n8 | t211 | t212 |
| | | e9-n9 | t221 | t222 |
| | | e10-n10 | t231 | t232 |
| | | e11-n11 | t241 | t242 |
| | | e12-n12 | t251 | t252 |
| ⋮ | | | | |

FIG. 24

| LATITUDE-LONGITUDE | RADIO ZONE | POSITION REGISTRATION AREA |
|---|---|---|
| e1-n1 | | |
| e2-n2 | | |
| ⋯ $e_i$-$n_i$ | ⋯ | ⋯ |

FIG. 25

| RULE NO. | RULE CONFIRMATION PORTION | CHANGEOVER RULE PORTION | | |
|---|---|---|---|---|
| | | RADIO ZONE NO. | POSITION REGISTRATION AREA NO. | PASS-BY TIME |
| | | | | MINIMUM VALUE | MAXIMUM VALUE |
| 1 | NONE | C11, | L11 | t141 | t142 |
| | | C11₁, | L11₁ | t151 | t152 |
| | | C11₂, | L11₂ | t161 | t162 |
| | | C11₃, | L11₃ | t171 | t172 |
| | | . . . | | t181 | t182 |
| | | C21, | L21 | t191 | t192 |
| 2 | NONE | C11, | L11 | t201 | t202 |
| | | . . . | | t211 | t212 |
| | | . . . | | t221 | t222 |
| | | . . . | | t231 | t232 |
| | | . . . | | t241 | t242 |
| | | C31, | L31 | t251 | t252 |

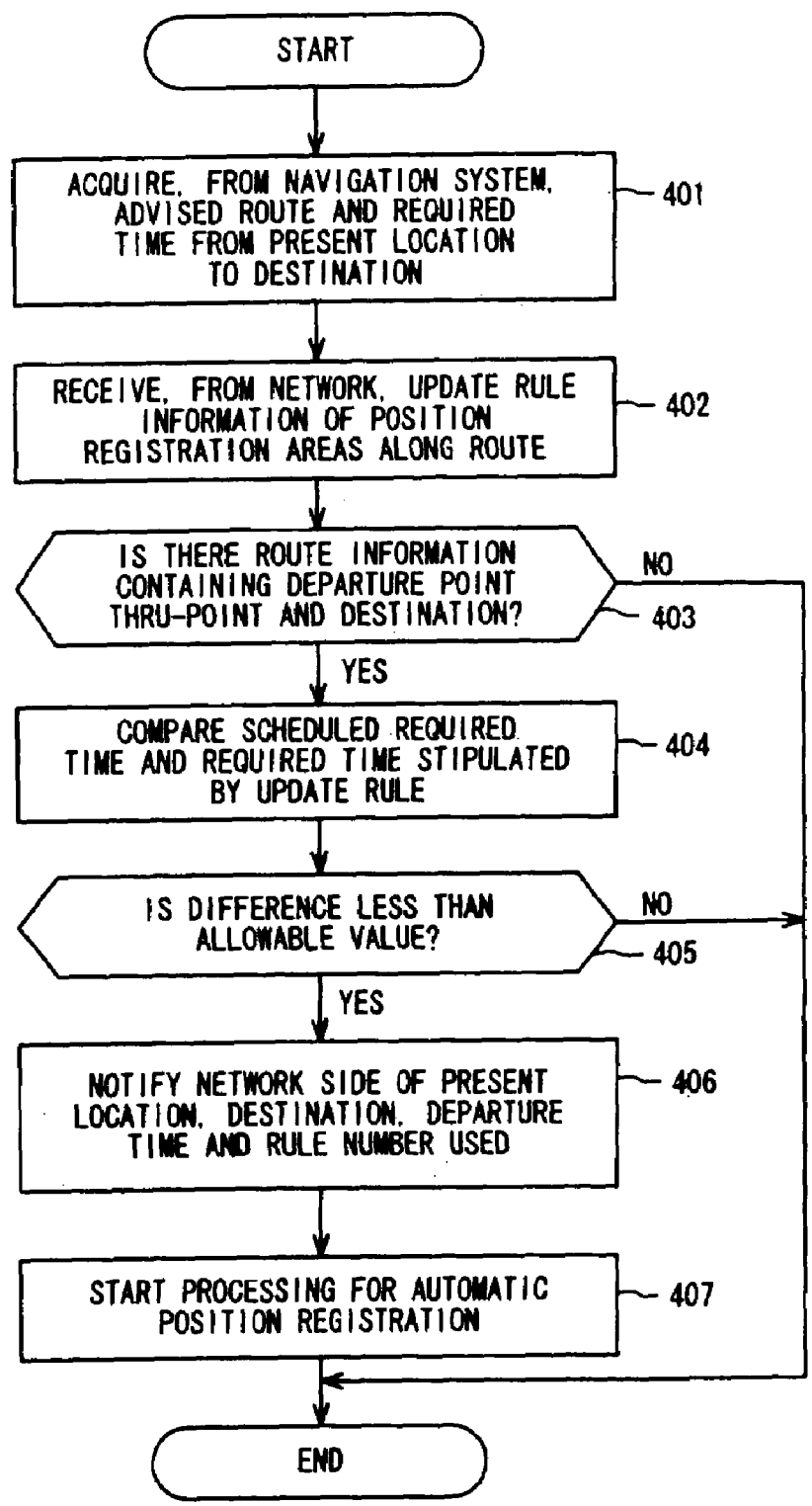

FIG. 29

| RULE FORMAT NO. | RULE DATA | | | | |
|---|---|---|---|---|---|
| | RULE NO. | RULE CONFIRMATION PORTION | | CHANGEOVER RULE PORTION | |
| 1 | | RADIO ZONE ID | TRAVEL TIME (MINIMUM VALUE / MAXIMUM VALUE) | POSITION REGISTRATION AREA ID | CHANGEOVER TIME (MINIMUM VALUE / MAXIMUM VALUE) |
| | 1 | C2→C8 | tM11 / tM12 | L2 | t21 / t22 |
| | | | | L3 | t31 / t32 |
| | | | | L4 | t41 / t42 |
| | 2 | C5→C14 | tM21 / tM22 | L5 | t51 / t52 |
| | | | | L6 | t61 / t62 |
| | | | | L7 | t71 / t72 |
| | 3 | C2→C8 | tM31 / tM32 | L2 | t81 / t82 |
| | | | | L3 | t91 / t92 |
| | | | | L4 | t101 / t102 |
| | 4 | C5→C14 | tM41 / tM42 | L5 | t111 / t112 |
| | | | | L6 | t121 / t122 |
| | | | | L7 | t131 / t132 |
| | ... | | | | |
| 2 | RULE NO. | RULE CONFIRMATION PORTION | | CHANGEOVER RULE PORTION | |
| | | | | LATITUDE-LONGITUDE INFORMATION | PASS-BY TIME (MINIMUM VALUE / MAXIMUM VALUE) |
| | 1 | NONE | | e1-n1 | t141 / t142 |
| | | | | e2-n2 | t151 / t152 |
| | | | | e3-n3 | t161 / t162 |
| | | | | e4-n4 | t171 / t172 |
| | | | | e5-n5 | t181 / t182 |
| | | | | e6-n6 | t191 / t192 |
| | 2 | NONE | | e7-n7 | t201 / t202 |
| | | | | e8-n8 | t211 / t212 |
| | | | | e9-n9 | t221 / t222 |
| | | | | e10-n10 | t231 / t232 |
| | | | | e11-n11 | t241 / t242 |
| | | | | e12-n12 | t251 / t252 |
| | ... | | | | |

RULE NO. 1 OF RADIO ZONE 5

RULE CONFIRMATION PORTION 2

| RADIO ZONE ID | TRAVEL TIME |
|---|---|
| C5→C6 | tM81~tM82 |

CHANGEOVER RULE PORTION 3

| POSITION REGISTRATION AREA ID | CHANGEOVER TIME |
|---|---|
| L1-2 | t271~272 |
| L1-3 | t281~282 |
| L1-4 | t291~292 |

(b)

RULE NO. 2 OF RADIO ZONE 5

RULE CONFIRMATION PORTION 2

| RADIO ZONE ID | TRAVEL TIME |
|---|---|
| C5→C4 | tM91~tM92 |

CHANGEOVER RULE PORTION 3

| POSITION REGISTRATION AREA ID | CHANGEOVER TIME |
|---|---|
| L2-2 | t301~302 |
| L2-1 | t311~312 |
| L2-0 | t321~322 |

FIG. 33

CHANGEOVER-FREQUENCY
NOTIFICATION INFORMATION

| | |
|---|---|
| HIGHER-ORDER AREA CHANGEOVER FREQUENCY | *1, 2 |
| LOWER-ORDER AREA CHANGEOVER FREQUENCY | *1, 3 |

*1 UNITS: SECONDS
*2 IF UPDATING OF POSITION REGISTRATION AREA WAS REQUIRED IN TIME SHORTER THAN THIS TIME, CHANGE TO LARGE POSITION REGISTRATION AREA
*3 IF UPDATING OF POSITION REGISTRATION AREA WAS NOT REQUIRED WITHIN THIS TIME, CHANGE TO SMALL POSITION REGISTRATION AREA

FIG. 34

RULE FOR AUTOMATIC POSITION REGISTRATION CHANGEOVER

(a) RULE OF RADIO ZONE 1

RULE NO. 1
RULE CONFIRMATION PORTION ⟋2

| RADIO ZONE ID | TRAVEL TIME |
|---|---|
| C1→C2 | tM101~tM102 |

CHANGEOVER RULE PORTION ⟋3

| POSITION REGISTRATION AREA ID | CHANGEOVER TIME |
|---|---|
| L1-1 | t271~272 |
| L1-2 | t281~282 |
| L1-3 | t291~292 |

RULE NO. 2
RULE CONFIRMATION PORTION ⟋2

| RADIO ZONE ID | TRAVEL TIME |
|---|---|
| C1→C2 | tM111~tM112 |

CHANGEOVER RULE PORTION ⟋3

| POSITION REGISTRATION AREA ID | CHANGEOVER TIME |
|---|---|
| L2-1 | t301~302 |
| L2-2 | t311~312 |
| L2-3 | t321~322 |

RULE NO. 3
RULE CONFIRMATION PORTION ⟋2

| RADIO ZONE ID | TRAVEL TIME |
|---|---|
| C1→C2 | tM121~tM122 |

CHANGEOVER RULE PORTION ⟋3

| POSITION REGISTRATION AREA ID | CHANGEOVER TIME |
|---|---|
| L3-1 | t301~302 |
| L3-2 | t311~312 |
| L3-3 | t321~322 |

(b) RULE OF RADIO ZONE 2

RULE NO. 1
RULE CONFIRMATION PORTION ⟋2

| RADIO ZONE ID | TRAVEL TIME |
|---|---|
| C2→C3 | tM131~tM132 |

CHANGEOVER RULE PORTION ⟋3

| POSITION REGISTRATION AREA ID | CHANGEOVER TIME |
|---|---|
| L1-1 | t331~332 |
| L1-2 | t341~342 |
| L1-3 | t351~352 |

RULE NO. 2
RULE CONFIRMATION PORTION ⟋2

| RADIO ZONE ID | TRAVEL TIME |
|---|---|
| C2→C3 | tM141~tM142 |

CHANGEOVER RULE PORTION ⟋3

| POSITION REGISTRATION AREA ID | CHANGEOVER TIME |
|---|---|
| L2-1 | t361~362 |
| L2-2 | t371~372 |
| L2-3 | t381~382 |

RULE NO. 3
RULE CONFIRMATION PORTION ⟋2

| RADIO ZONE ID | TRAVEL TIME |
|---|---|
| C2→C3 | tM151~tM152 |

CHANGEOVER RULE PORTION ⟋3

| POSITION REGISTRATION AREA ID | CHANGEOVER TIME |
|---|---|
| L3-1 | t391~392 |
| L3-2 | t401~402 |
| L3-3 | t411~422 |

(c) RULE OF RADIO ZONE 3

RULE NO. 1
RULE CONFIRMATION PORTION ⟋2

| RADIO ZONE ID | TRAVEL TIME |
|---|---|
| C3→C4 | tM161~tM162 |

CHANGEOVER RULE PORTION ⟋3

| POSITION REGISTRATION AREA ID | CHANGEOVER TIME |
|---|---|
| L1-2 | t421~422 |
| L1-3 | t431~432 |
| L1-4 | t441~442 |

RULE NO. 2
RULE CONFIRMATION PORTION ⟋2

| RADIO ZONE ID | TRAVEL TIME |
|---|---|
| C3→C4 | tM171~tM172 |

CHANGEOVER RULE PORTION ⟋3

| POSITION REGISTRATION AREA ID | CHANGEOVER TIME |
|---|---|
| L2-1 | t451~452 |
| L2-2 | t461~462 |
| L2-3 | t471~472 |

RULE NO. 3
RULE CONFIRMATION PORTION ⟋2

| RADIO ZONE ID | TRAVEL TIME |
|---|---|
| C3→C4 | tM181~tM182 |

CHANGEOVER RULE PORTION ⟋3

| POSITION REGISTRATION AREA ID | CHANGEOVER TIME |
|---|---|
| L3-1 | t481~482 |
| L3-2 | t491~492 |
| L3-3 | t501~502 |

MOBILE RADIO COMMUNICATION SYSTEM AND METHOD OF REGISTERING POSITION THEREIN

CROSS-REFERENCE TO RELATED APPLICATION

The present application is a continuation of International Application No. PCT/JP01/05100 which was filed on Jun. 15, 2001.

BACKGROUND OF THE INVENTION

This invention relates to a mobile radio communication system and to a method of registering position in this system. More particularly, the invention relates to a mobile radio communication system, as well as to a position registration method thereof, in which a position registration area number is reported from a base station to a mobile station within a radio zone, position information indicating a position registration area in which a mobile station resides is stored based upon position registration information that has been transmitted from the mobile station, and when there is an incoming call to a mobile station, a paging call is placed from a plurality of base stations within the position registration area, in which the base station resides, based upon the position information.

In a mobile radio communication system, a base station notifies all mobile stations within a cell of common information such as a position registration area number, a mobile station refers to this reported information, performs monitoring to determine whether it has moved into a position registration area different from that until now and, if it moves into such an area, transmits a position registration signal to a mobile communication control station, which has a radio channel control function or a mobile communication control function, via a base station. The mobile communication control station, under the control of a position registration controller, registers subscriber data of the mobile station and position information indicating the position registration area in which the mobile station resides in a database of a home memory station based upon the position registration signal. When there is an incoming call to the mobile station, a gateway exchange obtains a mobile communication control station, which conforms to the position registration area in which the call-terminating mobile station resides, by referring to the position information that has been stored in the database, and places a paging call from a plurality of base stations within the position registration area in which the mobile station resides via the mobile communication control station.

FIG. 35 is a diagram showing the configuration of a mobile radio system. Mobile stations $MS_1$ to $MS_8$ are terminals capable of bi-directional radio communication with base stations $BS_1$ to $BS_8$. The base stations $BS_1$ to $BS_8$ are capable of radio communication with the mobile stations $MS_1$ to $MS_8$ within radio zones $C_1$ to $C_8$ that are centered on respective ones of the base stations $BS_1$ to $BS_8$. The radio zones $C_1$ and $C_2$ of base stations $BS_1$ and $BS_2$ construct a position registration area (or paging call area) $PRA_1$, the radio zones $C_3$ and $C_4$ of base stations $BS_3$ and $BS_4$ construct a position registration area $PRA_2$, the radio zones $C_5$ and $C_6$ of base stations $BS_5$ and $BS_6$ construct a position registration area $PRA_3$, and the radio zones $C_7$ and $C_8$ of base stations $BS_7$ and $BS_8$ construct a position registration area $PRA_4$.

Mobile communication control stations $MSC_1$ and $MSC_2$ have functions for implementing call connection control and service control, etc., for the purpose of providing mobile communication services. Of these stations, the mobile communication control station MSC, is connected to base station $BS_1$ to $BS_4$ and the mobile communication control station $MSC_2$ is connected to base station $BS_5$ to $BS_8$. A gateway mobile communication exchange GS is an exchange that receives calls from another network to contract subscribers in its own network or to roaming subscribers in its own network. The mobile communication control stations $MSC_1$ and $MSC_2$ within this exchange's own network are connected via a communication line. Further, the gateway mobile communication exchange GS is connected to a database HLR of a home memory station HMS via a control signal line so as to be capable of referring to position information.

The database HLR is a database that stores subscriber data of the mobile stations $MS_1$ to $MS_4$ that reside in the position registration areas $PRA_1$ to $PRA_4$ and position information indicating in which of the areas the mobile stations reside. The mobile communication control stations $MSC_1$, $MSC_2$ receive position registration signals from the mobile station BS1 to BS8, thereby updating the stored content of the database HLR and registering information therein.

When the mobile station $MS_1$ receives an incoming call, a paging call is placed from all of the base stations $BS_1$, $BS_2$ within the position registration area $PRA_1$, in which the call terminating mobile station resides, by referring to the database HLR.

FIG. 36 is a diagram useful in describing an overview of a position registration and call terminating procedure in mobile radio communication.

The base stations $BS_1$, $BS_2$ report information for position registration to the mobile stations $MS_1$, $MS_2$ by notification information. If the mobile station $MS_2$ residing in the position registration area $PRA_1$ (see FIG. 35) moves into position registration area $PRA_2$ under these conditions, as indicated by the dashed line, the mobile station $MS_2$ detects the change in position registration area by way of the notification information from the base station $BS_3$. As a result, the mobile station $MS_2$ transmits a position registration signal. This position registration signal is sent to the mobile communication control station $MSC_1$ via the base station $BS_3$. The mobile communication control station $MSC_1$ executes an authentication procedure if it receives a position registration signal. If the result of authentication is normal, the communication control station instructs the database HLR to perform position registration, thereby registering a routing number to this control station as well as position information, and sends a position-registration receipt number back to the mobile station $MS_2$. Upon being instructed by the mobile communication control station $MSC_1$ to perform position registration, the database HLR registers the routing number and position information that indicates the position registration area in which the mobile station $MS_2$ resides. Registration of position at such time that the mobile station moves into another position registration area is completed by the above operation.

If the mobile station $MS_2$ receives an incoming call, the gateway mobile communication exchange GS extracts the subscriber number (mobile station number) of the mobile station $MS_2$ from the received dial number, reads position information (the routing number) of the mobile station $MS_2$ from the database HLR based upon the subscriber number and sets up a path to the mobile communication control station $MSC_1$ indicated by this routing number. As a result, the mobile communication control station $MSC_1$ instructs all base stations $BS_3$, $BS_4$ within the position registration area PRA$_2$ to perform a paging call. In response to the paging call, the mobile station MS$_2$ transmits an answer signal to the mobile communication control station MSC$_1$ via the base station. In response to the answer signal, the mobile communication control station MSC$_1$ establishes an available communication channel TCH through a well-known procedure and sets up a connection.

Thus, regardless of where a mobile station moves, position information indicative of the position registration area in which the mobile station resides is updated and registered in the database HLR of the home memory station HMS, as a result of which the mobile station is capable of receiving an incoming call from a calling party in another network.

FIG. 37 is an explanatory view illustrating the relationship between the size of a position registration area and amount of control information. If a position registration area is increased in size, the number of resident mobile stations at the time of a paging call. As a consequence, there is an increase in the number of call channels in order to distinguish among the mobile stations and there is an increase in amount of control information. If a position registration area is decreased in size, on the other hand, it is necessary to notify of a change in position registration frequently. When a position registration area is small, therefore, the amount of control information of position registration increases. There have been various proposals for setting the size of position registration areas so as to optimize the efficiency of paging call traffic and position registration traffic.

FIG. 38 is an explanatory view (see Japanese Patent No. 2987780) illustrating position registration areas of a mobile telephone system already proposed. Here C1 to C8 represent radio zones, and L1-1 to L1-4 denote position registration areas of a position registration area pattern of a first system, L2-1, L2-4 position registration areas of a position registration area pattern of a second system and L3-1 a position registration area pattern of a third system. According to this prior art, position registration area patterns of a plurality of systems of different sizes (ranges of movement) are prepared and an optimum position registration area pattern is assigned to each mobile station in accordance with the area of the range of motion, i.e., in accordance with the position registration traffic of each mobile station.

Another example of the prior art (see the specification of Japanese Patent Application Laid-Open No. 4-249925) is a position registration system that records, at both a mobile communication control station and mobile station, past radio zones for which positions have been registered as well as the particular times. In accordance with the recorded data, the mobile communication control station updates position registration automatically even if no position registration signal from the mobile station arrives. If the mobile station, on the other hand, is at a position the same as a predicted position that is based on the recorded data, the mobile station does not issue a position registration signal. If it is at a different position, then the mobile station issues a position registration signal. For example, this system is such that if, because of the user commuting to work, a mobile station (1) is present in radio zone C1 every morning at 8:00 AM and (2) is present in radio zone C2 at around 8:30 AM, this information is stored by the mobile communication control station and mobile station, whereby position registration need not be carried out if the mobile station moves in accordance with such a routine.

Though the first example of the prior at makes it possible to reduce the traffic involved in position registration, the reduction in traffic is inadequate because it is still necessary to update (to perform position registration of) the position registration area whenever a mobile station moves into a different position registration area. In addition, position registration is required even in a case where a mobile station moves with a certain regularity.

Though the second example of the prior art does not in principle require position registration, it is applicable only to a mobile station that exhibits customary behavior and, hence, the range of application is limited.

SUMMARY OF THE INVENTION

Accordingly, an object of the present invention is to so arrange it that even if a mobile station moves into a different position registration area, it is unnecessary for the mobile station to register its position with a mobile communication control station.

Another object of the present invention is to so arrange it that even though a mobile station does not register its position with a mobile communication control station, the latter is capable of assuming movement of the mobile station and of updating, automatically, the position registration area.

A further object of the present invention is to so arrange it that monitoring can be performed on the side of the mobile station to determine whether the assumption used in updating the position registration area by the mobile communication control station is correct or erroneous, wherein if the assumption is erroneous, a position registration signal is communicated from the mobile station to the mobile communication control station so that the position registration area will not be updated incorrectly.

A further object of the present invention is to so arrange it that in a case where it can be assumed that a mobile station will move with a certain regularity, the amount of control information for position registration can be reduced and, moreover, it is possible to achieve an attendant reduction in the power consumption of the mobile station.

According to the present invention, on the basis of one or more items from among placement of man-made structures, natural geographical features, present location of a mobile station, history of movement, traveling speed, time and schedule of the mobile station, etc., a mobile communication control station on the side of a network registers a rule for predicting the manner in which a mobile station will change its position registration area, e.g., a rule for predicting the timing at which the position registration area will be changed, in a storage unit. The mobile communication control station checks, for every mobile station, whether a state in which the rule is applicable has been attained. If the applicable state has been attained, the mobile communication control station updates the position registration area of the mobile station based upon the rule even without notification of position registration. If this arrangement is adopted, a mobile station need not register its position with respect to the mobile communication control station even if the mobile station moves into a different position registration area. Further, even if a mobile station does not register its position with a mobile communication control station, the latter can assume movement of the mobile station and perform position registration automatically. As a result, if it can be assumed that a mobile station will move with a certain regularity, the amount of control information for the purpose of position registration can be reduced and, moreover, it is possible to achieve an attendant reduction in the power consumption of the mobile station.

Further, in accordance with the present invention, any mobile station (even a mobile station for which customary behavior has not been detected) can update a position registration area automatically without requiring the reporting of position registration information indicating that the position registration area has changed.

Further, a mobile communication control station incorporates the above-mentioned rule in notification information and reports it to a mobile station from a base station, and the mobile station halts the transmission of position registration information if the state in which the rule is applicable is attained. In other words, when a position registration area that has been presumed based upon the rule and a position registration area of which notification has been given from the network side agree a predetermined number of times, the mobile station judges that a state in which the rule is applicable has been attained and halts the transmission of position registration information. If this arrangement is adopted, the reliability of the assumption can be improved and highly reliable automatic updating of the position registration area becomes possible.

Further, if a position registration area that has been presumed based upon the rule differs from a position registration area of which notification has been given from the network side, the mobile station reports position registration information to the network side. Upon receiving this position registration information, the mobile communication control station corrects the rule, namely the timing at which the position registration area is changed, based upon reporting of the position registration information from the mobile station. If this arrangement is adopted, whether the assumption by mobile communication control station is correct or erroneous can be monitored on the side of the mobile station. If the assumption is erroneous, therefore, the mobile station can report this to the mobile communication control station so that erroneous position registration will not take place. Moreover, the rule can be corrected in accordance with present circumstances.

BRIEF DESCRIPTION OF THE DRAWINGS

FIG. 4 is a diagram of the relationship between position registration areas and radio zones;

FIG. 6 is a diagram useful in describing changeover rule data;

FIG. 7 is a diagram showing the data structure of rules, which are for changing over a position registration area, registered in a rule database;

FIG. 8 is a diagram useful in describing notification information to which a rule has been added;

FIG. 12 is an example of rule data, which is for updating a position registration area, to which a new rule conforming to actual movement has been added;

FIG. 14 is a diagram useful in describing rule data for updating a position registration area in FIG. 13;

FIG. 16 is a diagram useful in describing rule data for updating a position registration area;

FIG. 17 is a status explanatory view of a rule for updating a position registration area based upon time;

FIG. 18 is a diagram useful in describing rules for updating a position registration area based upon time;

FIG. 20 is an example of a database for converting a location/facility to a radio zone number;

FIG. 21 is an example of schedule information;

FIG. 22 is an example in which schedule information has been converted to the same format as that of position information (a radio zone number) reported from a base station;

FIG. 23 is an example of changeover rules in which the timings at which a plurality of intersections that exist along a path between any two points are passed are adopted as timings for changing over a position registration area;

FIG. 24 is a table for converting latitude-and-longitude information to radio zone/position registration area numbers;

FIG. 25 shows rules for updating a position registration area, in which latitude-and-longitude information has been converted to radio zone/position registration area numbers;

FIG. 28 is a flowchart of processing by a mobile station in a case where a position registration area is updated automatically using navigation information;

FIG. 29 is an example of rules for updating position registration areas having a plurality of different formats;

FIG. 31 is an example of changeover rules in a case where multiple series of position registration areas exist in one radio zone;

FIG. 33 is an example of changeover-frequency notification information;

FIG. 34 is another example of changeover rules in a case where multiple series of position registration areas exist in one radio zone;

DESCRIPTION OF THE PREFERRED EMBODIMENTS (A) First Embodiment (a) Configuration of Mobile Radio System FIG. 1 is a diagram of the configuration of part of a mobile radio system according to the present invention. Mobile stations $MS_1$ to $MS_4$ are portable mobile terminals capable of bi-directional radio communication with base stations $BS_1$ to $BS_4$. The base stations $BS_1$ to $BS_4$ are capable of radio communication with the mobile stations $MS_1$ to $MS_4$ within radio zones $C_1$ to $C_4$ that are centered on respective ones of the base stations $BS_1$ to $BS_4$. The radio zones $C_1$, $C_2$ of base stations $BS_1$, $BS_2$ construct a position registration area (or paging call area) $PRA_1$, and the radio zones $C_3$, $C_4$ of base stations $BS_3$, $BS_4$ construct a position registration area $PRA_2$.

Figure 1:
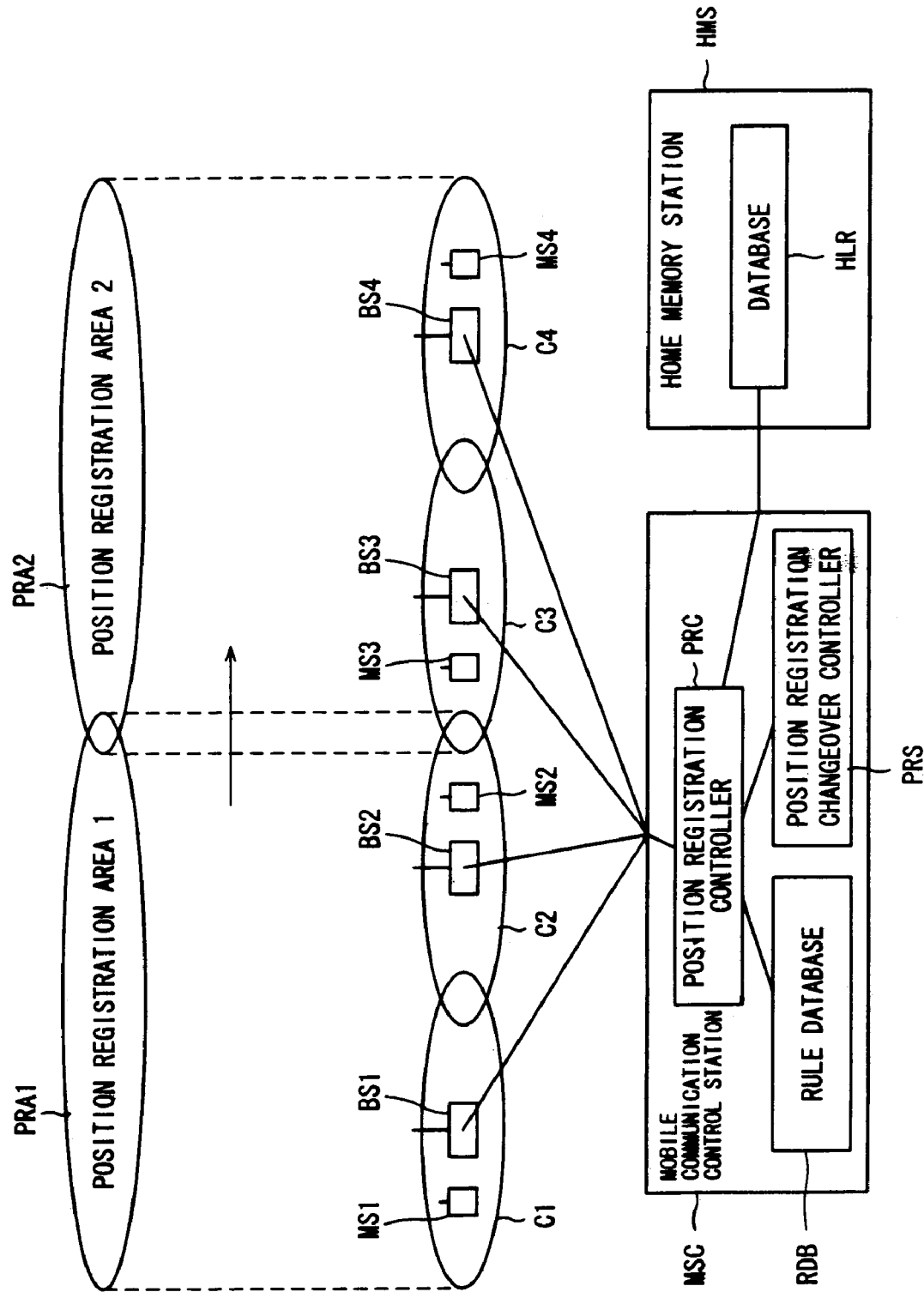
FIG. 1 is a diagram of the configuration of a mobile radio system according to the present invention.

A mobile communication control station MSC has functions for implementing call connection control for mobile communication services and control for position registration, etc., and is connected to the base stations $BS_1$ $BS_4$. In the mobile communication control station MSC, a position registration controller PRC executes position registration control, a rule database RDB stores a rule for predicting the manner in which a position registration area is updated by movement of a mobile station, and a position registration changeover controller PRS updates the position registration area of the mobile station automatically in accordance with the rule. Home memory station HMS, which has database HLR, stores position information, which indicates the position registration areas in which mobile stations reside, as well as subscriber data in the database HLR. It should be noted that FIG. 1 only illustrates part of the mobile radio system. In actuality, a number of position registration areas, radio zones, mobile stations and mobile communication control stations are provided.

(b) Structure of Mobile Station

Figure 2:
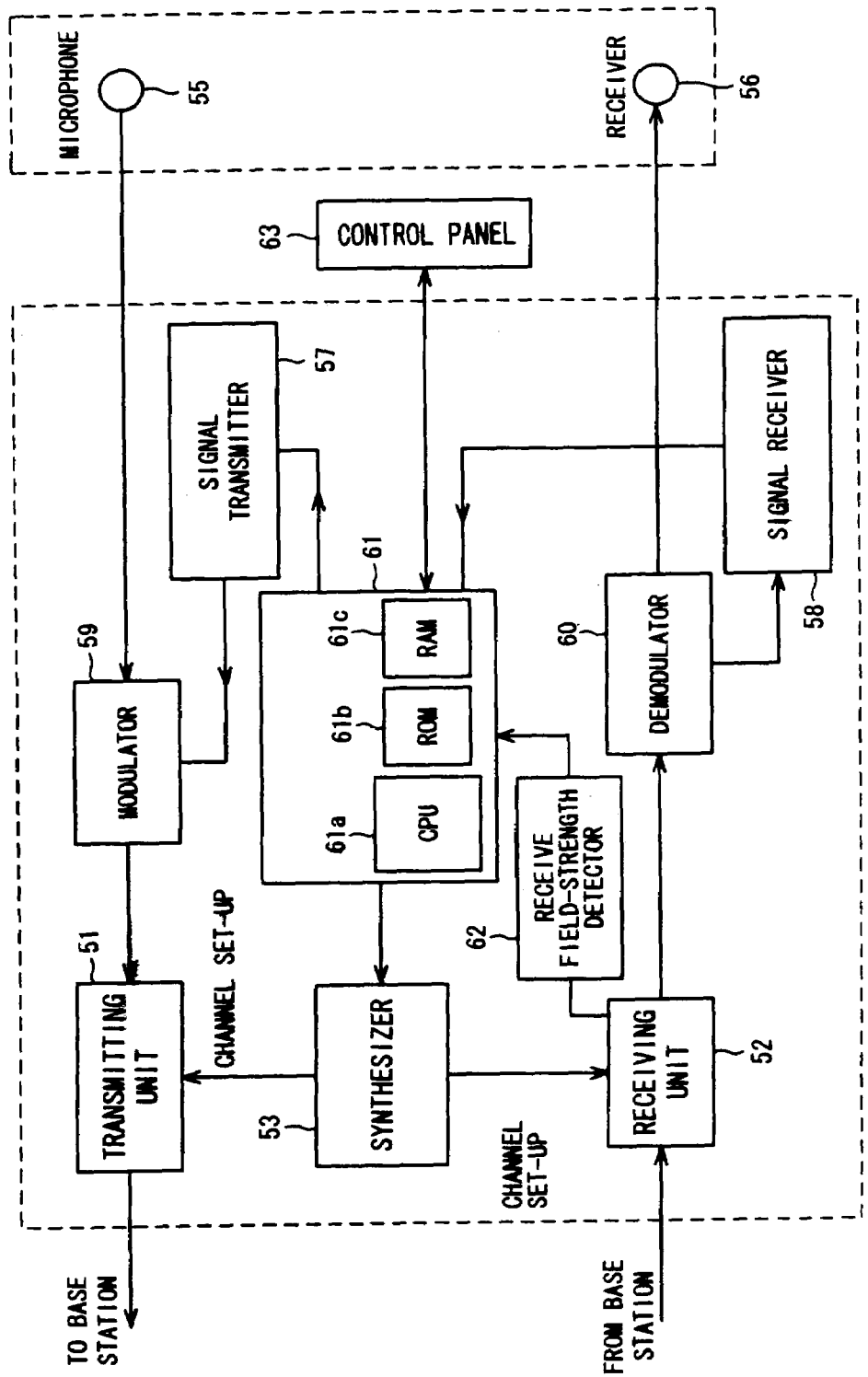
FIG. 2 is a block diagram of a mobile station.

FIG. 2 is a block diagram of a mobile station. The mobile station has a transmitting unit 51; a receiving unit 52; a synthesizer 53 for outputting a prescribed frequency signal that conforms to the control channel or communication channel; a microphone 55; a receiver 56 for outputting received voice; a signal transmitter 57 for outputting data that is sent to a radio base station; a signal receiver 58 for extracting and outputting notification information that has been sent from a radio base station via the control channel; a modulator 59 for modulating a signal that has entered from the microphone or signal transmitter; a demodulator 60 for demodulating a signal that has been sent from a radio base station; a microprocessor-equipped controller 61 for performing connection control, such as control of outgoing and incoming calls, and control of position registration, described later; a receive field-strength detector 62 for detecting receive field strength of received radio waves; and a control panel 63. The controller 61 has a processor (CPU) 61a, a program memory (ROM) 61b for storing various control programs, and a data memory (RAM) 61c for storing various data. A rule for updating a position registration area and position registration area number, which are sent from the network side (the mobile communication control station MSC), are stored in the data memory 61c.

The controller 61 ① performs position registration control and ② assumes a standby state upon setting the synthesizer 53 or receiving unit 52 or demodulator 60 to the control channel. ③ Further, when an outgoing call is made, the controller 61 transmits a connect request signal from the signal transmitter 57 on the control channel and receives an answer signal from a base station by the signal receiver 58. If a channel designation signal is received from a base station, the controller sets the synthesizer 53 or the receiving unit 52 or the demodulator 60 so as to be tuned to the designated communication channel (radio channel) and thenceforth establishes call with the other party via the communication channel. ④ During the call, the controller exercises handover control based upon the receive field strength. ⑤ Furthermore, if, when there is an incoming call, the controller 61 receives a channel designation signal from a base station via the control channel, the controller sets the synthesizer 53 or the receiving unit 52 or the demodulator 60 to the designated communication channel and thenceforth establishes a call with the other party via the communication channel.

(c) Rule for Updating Position Registration Area

Figure 3:
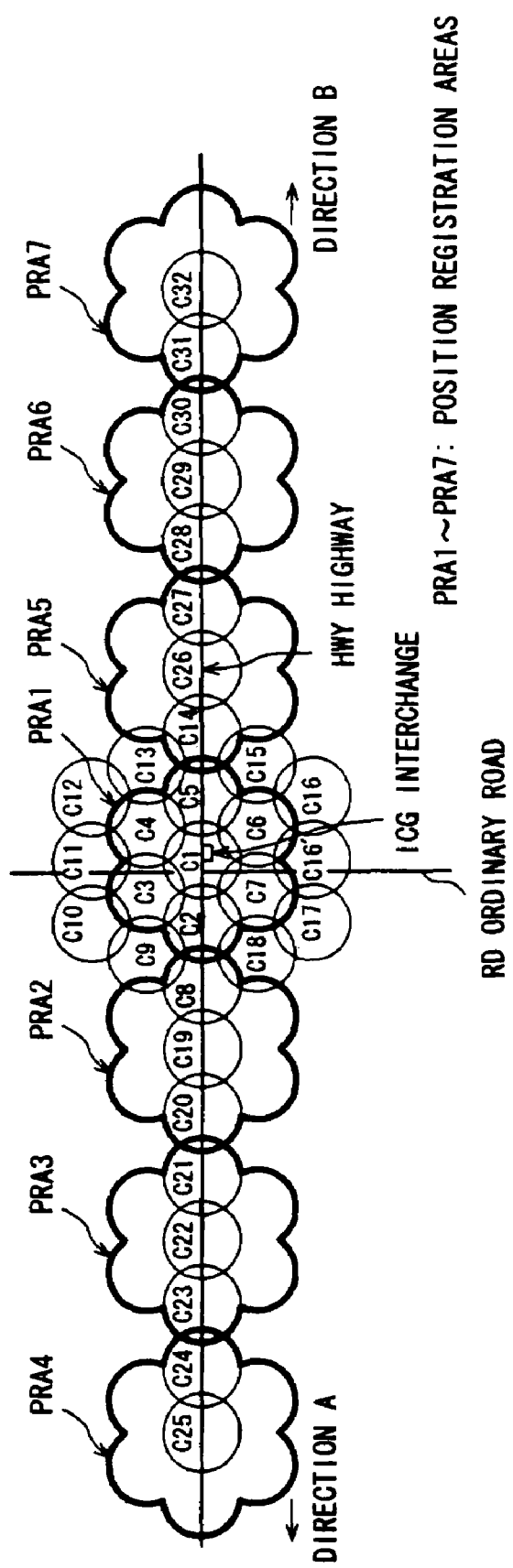
FIG. 3 is a status explanatory view useful in describing a rule for updating a position registration area.

FIG. 3 is a status explanatory view useful in describing a rule for updating a position registration area. A rule for updating a position registration area is assumed based upon information concerning man-made structures, natural geographical features, present location of a mobile station, history of movement and traveling speed. In FIG. 3, a highway HWY runs from east to west, a number of radio zones C1 to C32 and position registration areas PRA 1 to PRA7 exist along the highway, and an interchange ICG is provided at a prescribed location (in radio zone C1). An ordinary road RD the highway overhead. The relationship between the position registration areas and the radio zones is as shown in FIG. 4. All of the radio zones that belong to position registration area PRA1 are illustrated. For the sake of convenience, it is assumed that position registration area IDs are L1, L2, . . . , L7 for position registration area PRA1 and onward, and that radio zone IDs are C1, . . . , C32, in order.

In FIG. 3, it can be assumed that several mobile stations among those in radio zone C1 utilize the highway HWY owing to the placement of the interchange ICG, which is a man-made structure. Further, the mobile station of a vehicle that has utilized the highway HWY will travel in direction A or direction B, and it can be assumed that mobile stations utilizing the highway will travel at approximately the same speed. In other words, if it is assumed that a mobile station will travel in direction A from radio zone C2 to radio zone C8 at time tM11 to tM12, then it may be predicted that the mobile station will move from position registration areas PRA2, PRA3, PRA4 into the immediately adjacent position registration areas PRA3, PRA4 . . . at times t21 to t22, t31 to t32 and t41 to t42, respectively. Accordingly, a rule RL1, which adds on the immediately adjacent position registration areas PRA3, PRA4 . . . at times t21, t32, t42, respectively, and deletes the position registration areas PRA2, PRA3, PRA4 at times t22, t32, t42, respectively, is stored in the rule database RDB. Further, if it is assumed that a mobile station will travel in direction B from radio zone C5 to radio zone C14 at time tM21 to tM22, then it may be predicted that the mobile station will move from position registration areas PRA5, PRA6, PRA7 into the immediately adjacent position registration areas PRA6, PRA7 . . . at times t51 to t52, t61 to t62 and t71 to t72, respectively. Accordingly, a rule RL2, which adds on the immediately adjacent position registration areas PRA6, PRA7 . . . at times t51, t61, t71, respectively, and deletes the position registration areas PRA5, PRA6, PRA7 at times t52, t62, t72, respectively, is stored in the rule database RDB.

Figure 5:
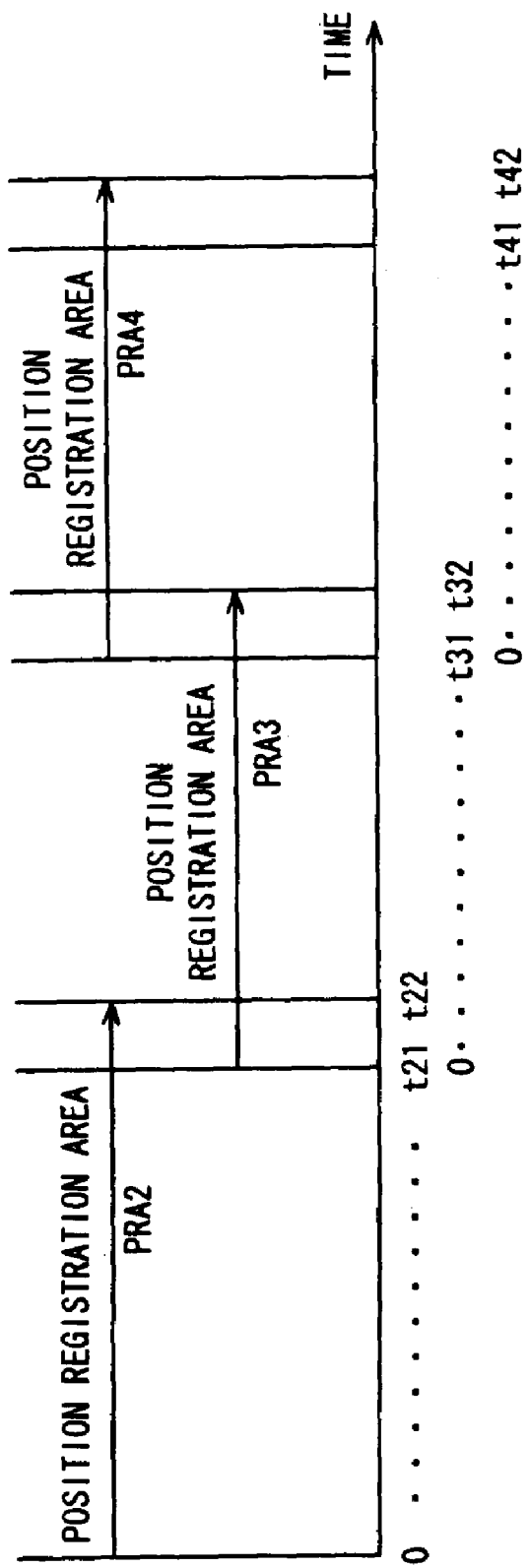
FIG. 5 is an explanatory view illustrating the relationship between position registration areas and changeover times in case of a forward direction A in FIG. 3.

FIG. 5 is an explanatory view illustrating the relationship between position registration areas and changeover times in case of forward direction A. Minimum/maximum times at which a mobile station moves from position registration area PRA2 to the next adjacent position registration area PRA3 are t21/t22. Similarly, minimum/maximum times at which the mobile station moves from position registration area PRA3 to the next adjacent position registration area PRA4 are t31/t32, and minimum/maximum times at which the mobile station moves from position registration area PRA4 to the next adjacent position registration area are t41/t42. It is assumed that the mobile station is present at the boundaries between two mutually adjacent radio zones at times t21 to t22, t31 to t32, t41 to t42.

The position registration controller PRC of the mobile communication control station MSC reads the rules RL1, RL2 out of the rule database RDB, adds the rules RL1, RL2 onto notification information according to the format shown in FIG. 6 and reports the resulting information to the mobile station from base stations in radio zones C2, C5 to which a rule confirmation portion in position registration area PRA1 is applied. Further, the position registration controller PRC inputs the rules RL1, RL2 to the position registration changeover controller PRS as well.

FIG. 7 is a diagram showing the data structure of rules, which are for changing over a position registration area, stored in the rule database RDB. Data is composed of a rule number portion 1, a rule confirmation portion 2 that stipulates rule application conditions, and a changeover rule portion 3 that stipulates changeover timing at which a position registration area is changed over. In the example of FIG. 3, the rule confirmation portion 2 stipulates ① that the mobile station moves in the A direction from radio zone C2 to radio zone C8 at times tM11 to tM12 and ② that the mobile station moves in the B direction from radio zone C5 to radio zone C14 at times tM21 to tM22.

The changeover rule portion 3 stipulates the changeover timings of the position registration areas in respective ones of rules 1 and 2.

FIG. 8 is a diagram useful in describing notification information to which a rule has been added. A rule RL for updating a position registration area is transmitted upon being mapped to an extension information element section 4 of ordinary notification information. The notification information includes a position number 5 (the position registration area ID).

(d) Position Registration Control in Mobile Station

Figure 9:
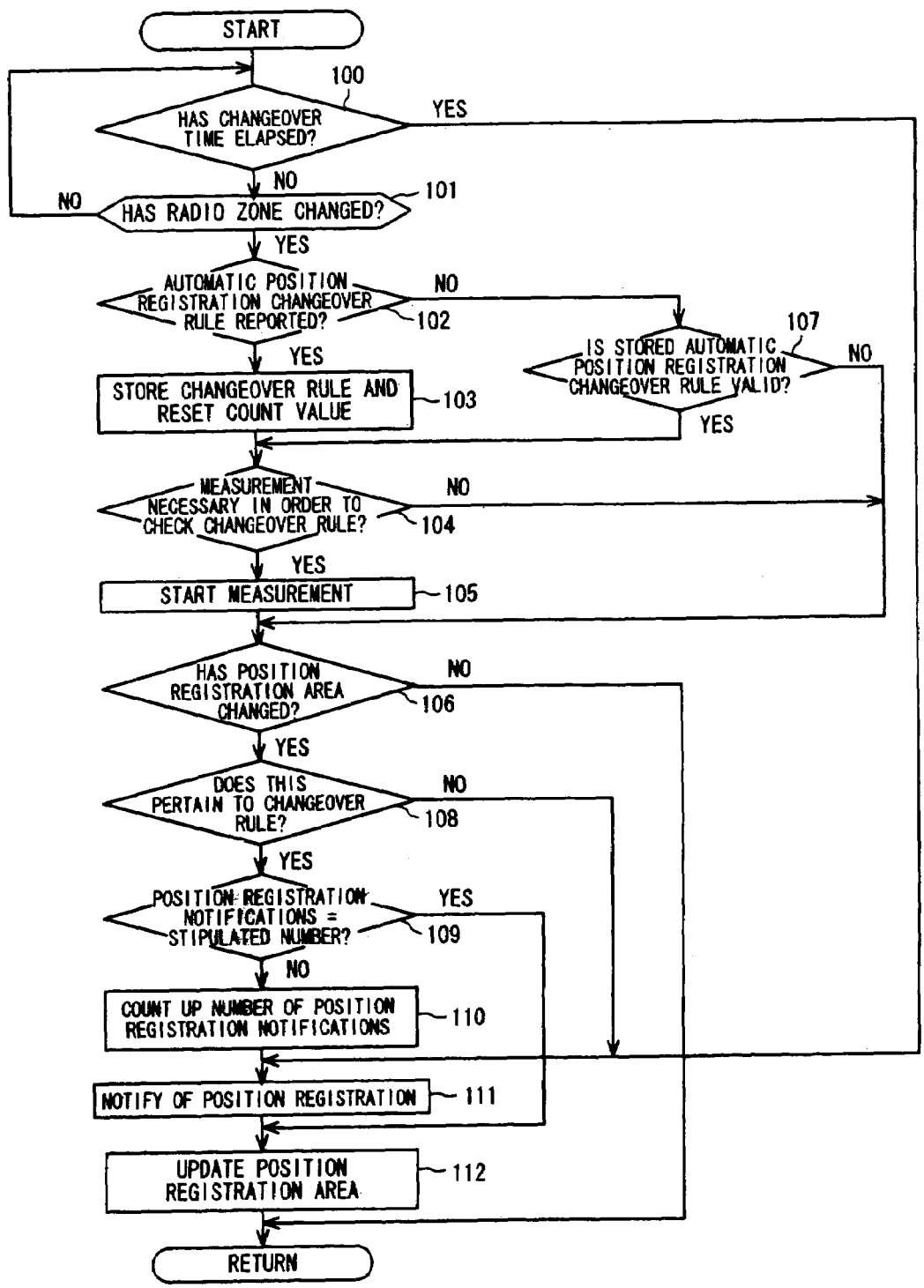
FIG. 9 is a processing flowchart of position registration control at a mobile station.

FIG. 9 is a flowchart of processing of position registration control at a mobile station.

The controller 61 of the mobile station performs monitoring to determine whether changeover time as elapsed (step 100). If changeover time has not elapsed, the controller determines whether a radio zone has changed (step 101). After the controller has recognized the fact that the mobile station has changed radio zones [i.e., has traveled from radio zone C1 (FIG. 3) to radio zone C2] before elapse of changeover time, the controller determines whether rule data for updating the position registration area is contained in notification information received from the mobile communication control station MSC (step 102). Since the notification information received in radio zone C2 does contain rule RL1 shown in FIG. 6, the controller 61 of the mobile station stores rule RL1 in a data memory 64 and resets a counted value (step 103). The controller checks to see whether it is necessary to measure residence time in radio zone C2 (step 104). Since it is necessary to measure residence time, based upon the rule confirmation portion 2 of rule RL1, until the mobile station moves from radio zone C2 to radio zone C8, the controller measures the time it takes to travel to radio zone C8 (step 105).

Next, the controller determines whether the previous radio zone into which it moved is within the same position registration area (step 106). Since radio zone C1 and radio zone C2 are in the same area, processing is exited, control returns to step 101 and the controller waits for the next change of radio zone.

Next, after the controller 61 of the mobile station has recognized the fact that the mobile station has moved from radio zone C2 to radio zone C8, it receives notification information and determines whether the notification information contains rule data (steps 101, 102). Since the notification information received in radio zone C8 does not contain a rule for updating the position registration area, the controller investigates as to whether the rule that was stored at radio zone C2 is applicable (step 107). In a case where the mobile station has moved from radio zone C2 to radio zone C8, the rule RL1 in FIG. 6 is applicable and therefore is applied. The controller then determines whether measurement is necessary (step 104). In a case where the mobile station has moved to radio zone C8, the controller measures time up to movement into position registration area L3 because position registration changeover time from position registration area L2 to position registration area L3 is stipulated in rule RL1 (step 105).

Next, since the radio zone C8 into which the mobile station has moved has changed to position registration area L2, it is determined whether this pertains to a changeover rule (steps 106 to 108). Since a case where the mobile station is moving from radio zone C2 to radio zone C8 in time tM11 to tM12 pertains to the rule, the controller determines whether the number of times (the initial value of which is zero) position has been registered in application of the rule satisfies a stipulated number of times (step 109). If the number of times notification of position registration is stipulated is one, this means that position registration has still not been performed a single time and therefore the controller counts up the number of times notification has been given of position registration (step 110) and gives notification of position registration (step 111). The controller thenceforth updates the position registration data that has been stored in the data memory 61c (step 112). Control subsequently returns to step 101 and the controller waits for the next change of radio zone.

The radio zones in which the mobile station is present changes as following owing to movement: C8→C19, C19→C20. The controller 61 of the mobile station repeats the processing of steps 101→102→107→104→106→return whenever there is a change in these radio zones. In the travel represented by C8→C19, C19→C20, new measurement is not required and therefore processing from step 104 to step 106 is executed. If the mobile station moves from radio zone C20 to C21, the controller 61 of the mobile station renders a "YES" decision at step 106 because the position registration area has changed from L2 to L3. The controller thenceforth determines whether this applies to the changeover rule (step 108).

Since a case where the mobile station is moving from position registration area L2 to position registration area L3 in time t21 to t22 pertains to the rule, the controller determines the number of times position registration has been performed (step 109). Since notification of position registration has already been performed once, the position registration count is equal to the stipulated number of times. Accordingly, the controller updates the position registration area without giving notification of position registration (step 112). The controller thenceforth repeats the processing from step 101 onward. If circumstances apply to the above-mentioned rule, the controller updates the position registration area without giving notification of position registration.

If the situation does not apply to the rule at step 108, the controller 61 notifies the network side of position registration and updates the position registration area (steps 111, 112). For example, in a case where the mobile station has moved into radio zone C21 of position registration area L3 before the minimum changeover time elapses, the mobile station notifies of position registration in order to change over the position registration area of the mobile communication control station MSC to L3. Further, if the changeover time elapses at step 100, then the controller 61 notifies the network side of position registration and updates the position registration area (steps 111, 112). For example, if the maximum changeover time t22 elapses while the mobile station is still at the positions of radio zones C20, C19, C8 in the position registration area L2, then the mobile station performs notification of position registration in such a manner that the mobile communication control station MSC will not make the changeover to position registration area L3 erroneously.

Though the stipulated number of position registration notifications is one in the above description, this may just as well be zero. In such case notification of position registration would be halted as soon as the mobile station moves into radio zone C8.

(e) Position Registration Control by Mobile Communication Control Station MSC

Figure 10:
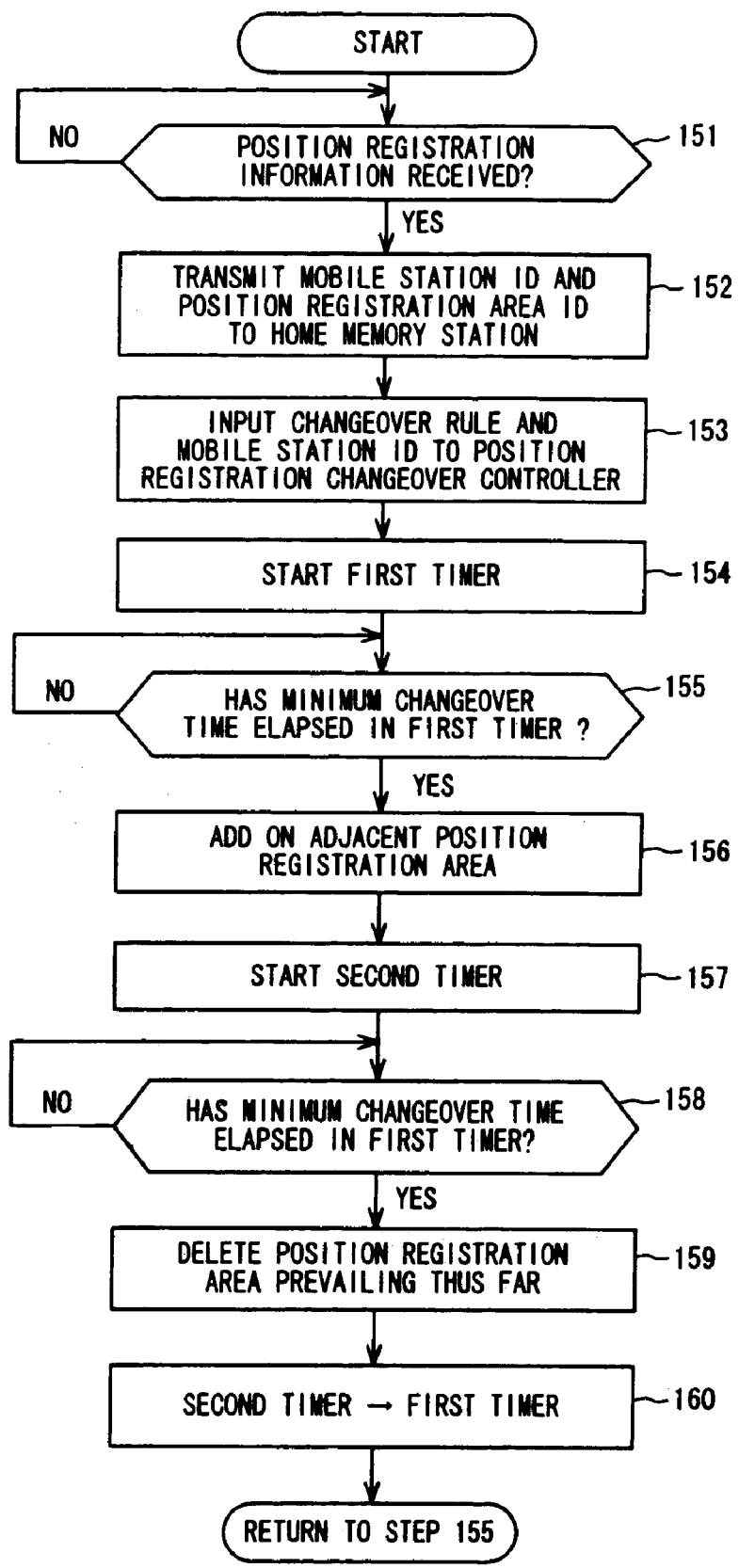
FIG. 10 is a processing flowchart of position registration control at a mobile communication control station MSC.

FIG. 10 is a processing flowchart of position registration control by the mobile communication control station MSC.

After the mobile station has moved so as to fall under the purview of the changeover rule, the position registration controller PRC of the mobile communication control station MSC receives position registration information and the applicable rule number from the mobile station (step 151). For example, the position registration controller receives the position registration information and applicable rule number when the mobile station has moved from position registration area PRA1 to PRA2. Upon receiving the position registration information, the position registration controller PRC transmits the ID of the mobile station and the ID of the position registration area to the database HLR of the home memory station HMS (step 152), acquires the changeover rule RL1, which is specified by the rule number reported from the mobile station, from the rule database RDB and inputs this to the position registration changeover controller PRS together with the ID of the mobile station (step 153).

The position registration changeover controller PRS starts a first timer (step 154) and, based upon the changeover rule RL1 reported, checks to see whether the time in the first timer has exceeded minimum changeover time t21 (step 155). If the time t21 has elapsed, this is reported to the database HLR of the home memory station HMS via the position registration controller PRC so as to add the position registration area L3 to the position information (step 156). As a result, the database HLR adds on L3, in addition to the position registration area L2, in association with the mobile station of interest. A second timer is thenceforth started (step 157).

Next, the position registration changeover controller PRS checks to see whether the time in the first timer has exceeded maximum changeover time t22 (step 158). If the time t22 has elapsed, this is reported to the database HLR of the home memory station HMS via the position registration controller PRC so as to delete the position registration area L2 (step 159). As a result, the database HLR deletes the position registration area L2, which has been stored in association with the mobile station of interest. Further, the second timer is made the first timer (step 160) and processing from step 155 onward is repeated. The position registration area can thenceforth be updated in conformity with the mobile station and timing even though no notification of position registration is given.

(f) Rule Revision Processing

If a position registration area presumed in accordance with a reported rule and the actual position registration area differ, i.e., in a case where it is found at step 108 in FIG. 9 that the situation does not apply to the changeover rule or it is found at step 100 that changeover time has elapsed, the mobile station reports position registration information to the network side. The disparity in position registration areas is a result of a difference between actual travelling speed of the mobile station and travelling speed that was assumed at the time of rule creation. Accordingly, if the presumed position registration area and the actual position registration area differ and the mobile station reports position registration information, then it is required that the position registration controller PRC revise the rule, i.e., position-registration update timing.

Figure 11:
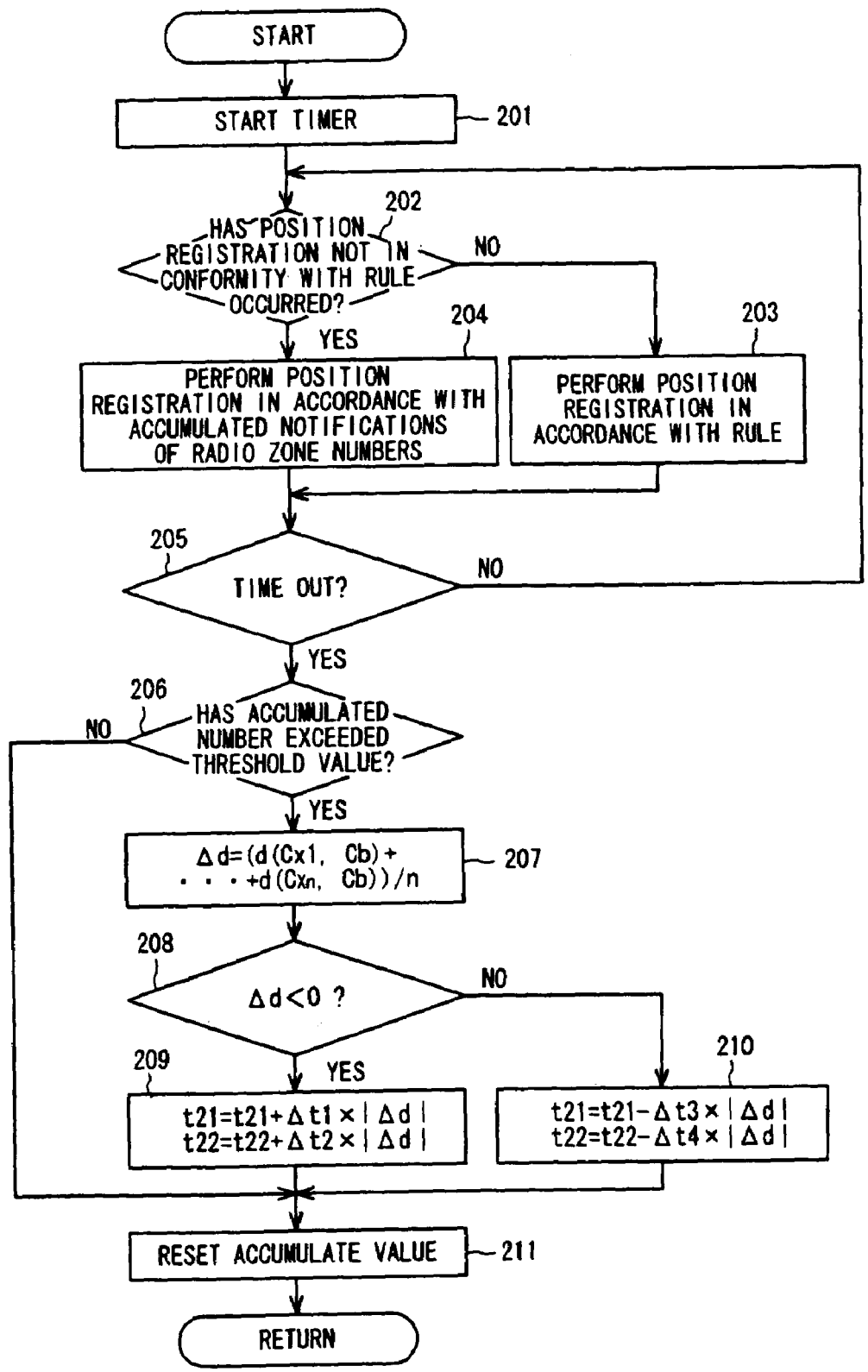
FIG. 11 is a rule revision processing flowchart.

FIG. 11 is a rule revision processing flowchart. The position registration controller PRC of the mobile communication control station MSC starts a timer at the start of position-registration update processing in accordance with a rule (step 201). The position registration controller checks to see whether notification of position registration that is not in accordance with the rule has occurred (step 202). If such notification has not occurred, then the position registration controller performs position registration in accordance with the rule (step 203). If such notification has occurred, then the position registration controller accumulates the numbers of radio zones Cxi and performs position registration in accordance with notification (step 204). The position registration controller subsequently checks to see whether the timer has timed out (step 205). If the timer has not timed out, processing from step 202 onward continues. If time-out is sensed, then the position registration controller determines whether the accumulated value of radio zone numbers has exceeded a threshold value (step 206). If the threshold value has been exceeded, then the position registration controller performs a calculation to determine how far the radio zone in which notification of position registration was given is from the boundary of the position registration area (step 207). Specifically, the position registration controller calculates an average distance Δd (step 207) in accordance with the following equation:

$$\Delta d=[d(Cx1, Cb)+d(Cx2, Cb)+\ldots+d(Cxn, Cb)]/n$$

and revises the rule (changeover timing) based upon the size and sign of the average distance. It should be noted that $d(Cx1, Cb)$ is a function for calculating how far radio zone $Cx1$ is from radio zone $Cb$ on the boundary of the position registration area, and that $\Delta d$ is the average distance of n-number of radio zones that have exceeded the accumulated value. Furthermore, $\Delta d$ may be a value obtained by totalling the differences between stipulated time (the average time of minimum changeover time/maximum changeover time) in a rule at such time that the situation is found to no longer apply to the rule at step 108 and the measured times and dividing the total by n.

Next, the position registration controller checks the sign of $\Delta d$ (step 208). If $\Delta d$ is negative, this means that the mobile station is present in position registration area L2 and has not moved to position registration area L3 even though the maximum changeover time t22 has elapsed. In other words, this means that the travelling speed is lower than the assumed speed. The position registration controller therefore effects updating in accordance with the following equations:

$$t21=t21+\Delta t1 \times |\Delta d|$$

$$t22=t22+\Delta t2 \times |\Delta d|$$

so as to lengthen the minimum changeover time t21 and maximum changeover time t22, and makes it unnecessary to notify of position registration (step 209).

If $\Delta d \geq 0$ holds, on the other hand, this means that the mobile station has moved to position registration area L3 before elapse of minimum changeover time t21, i.e., that the travelling speed is higher than the assumed speed. The position registration controller therefore effects updating in accordance with the following equations:

$$t31=t31-\Delta t3 \times |\Delta d|$$

$$t32=t32-\Delta t4 \times |\Delta d|$$

so as to shorten the minimum changeover time t21 and maximum changeover time t22, and makes it unnecessary to notify of position registration (step 210). If adjustment of traveling speed has thus been completed, the position registration controller resets the accumulated value (step 211), returns control to the beginning and commences the next monitoring operation.

In the revision processing set forth above, traveling times tM11, tM12 in the changeover confirmation portion 2 are not updated. However, these can be updated in a similar manner. Further, an old rule is updated to a new rule in the foregoing. However, it is possible to adopt an arrangement in which a former changeover rule is left without being updated and the new rule is added to and registered in the rule database RDB. FIG. 12 is an example in which newly defined changeover rules 3, 4 have been added to initial changeover rules 1, 2 (see FIG. 7).

(g) Method of Updating Rule Concerning Position Registration Area

Figure 13:
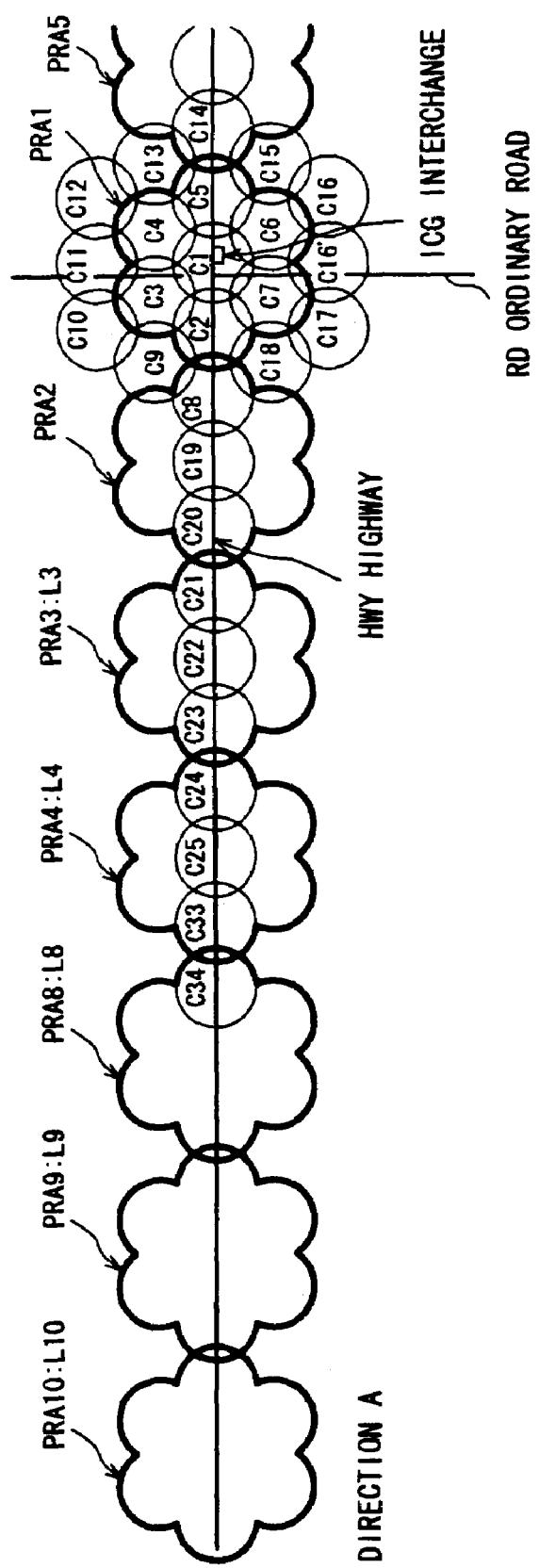
FIG. 13 is a status explanatory view in which a rule for updating a position registration area is changed.

In a case where a mobile station to which the rules of FIG. 7 have been applied moves from position registration area PRA4 to position registration areas PRA8, PRA9, PRA10 to which different rules are applied, as shown in FIG. 13, it is necessary to update the rules for position registration changeover so that they will be applicable in each of the position registration areas PRA8, PRA9, PRA10.

In order to update a rule for position registration changeover, a base station informs a mobile station of a new rule for changing over position registration shown in FIG. 14 in radio zone C33 immediately before the rules for position registration changeover depicted in FIG. 7 cease being applicable. In response, the controller 61 of the mobile station renders a "YES" decision in regard to notification of automatic position registration changeover at step 102 in FIG. 9 and stores the reported changeover rule in the data memory 61c at step 103. If the mobile station moves from radio zone C33 to radio zone C34 in time tM51 to tM52 under these conditions, the situation falls under the purview of the new changeover rule of FIG. 14 and a "YES" decision is rendered at step 108. If it is assumed that the stipulated number of times notification is given of position registration is zero, the controller 61 of the mobile station updates the position registration area at step 112 without notifying of position registration. The mobile communication control station MSC thenceforth performs automatic updating of position registration in accordance with the new rule without notification of position registration being given.

(h) Modifications of First Embodiment

First Modification

Figure 15:
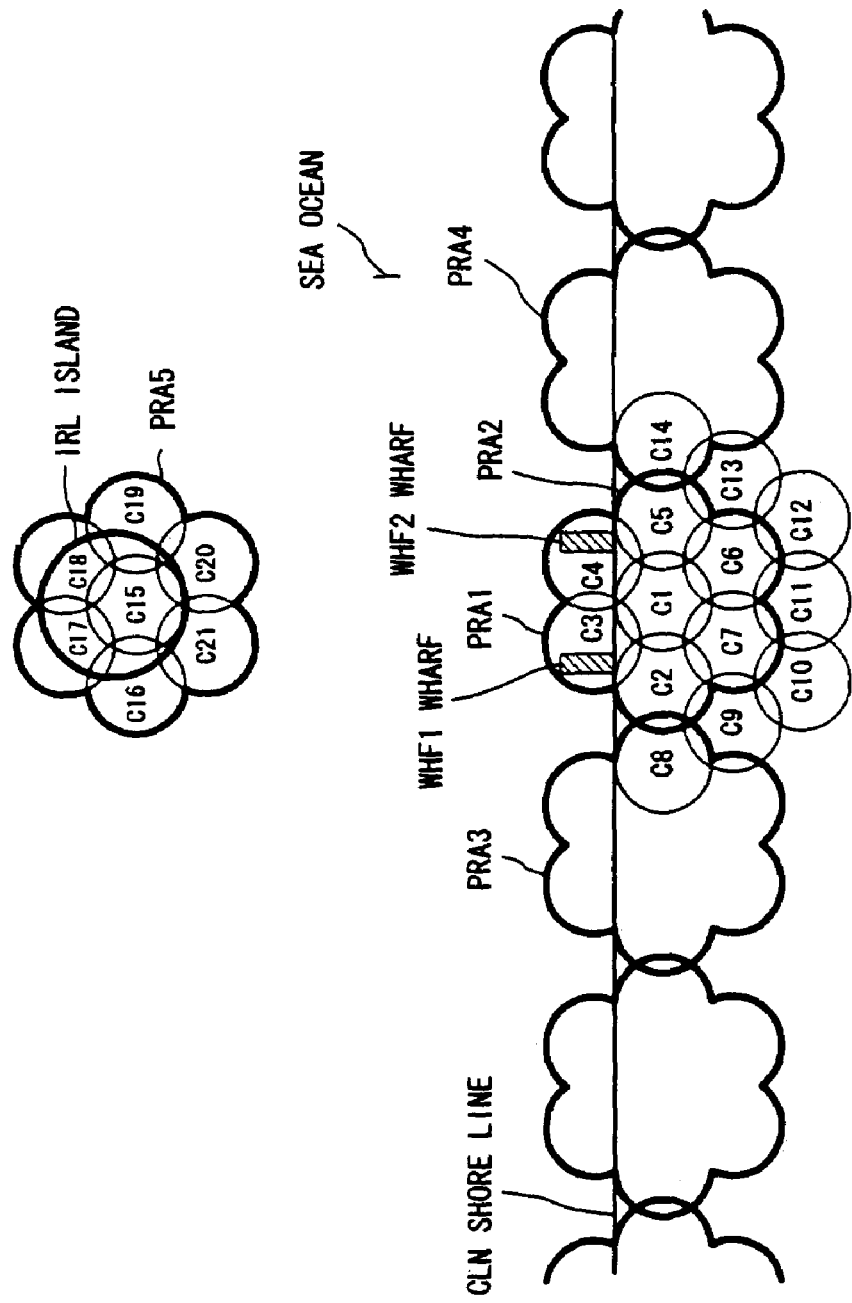
FIG. 15 is another status explanatory view useful in describing a rule for updating a position registration area.

FIG. 15 is another status explanatory view useful in describing a rule for changing over position registration. The placement of geographical features, man-made structures, position registration areas and radio zones represents a situation different from that of FIG. 3. In FIG. 15, a shoreline CLN exists along the ocean SEA, man-made structures (wharves) WHF1, WHF2, which are locations where ships such as-boats and ferries to an island IRL arrive and depart, are formed at areas that are parts of the shoreline, and position registration areas PRA1 to PRA4 are disposed in the vicinity of the wharves. Further, a position registration area PRA5 is disposed on the island IRL. In comparison with the case of the first embodiment of FIG. 3, this arrangement differs only in the changeover rules for updating position registration areas; position registration control in the mobile communication control station MSC and mobile station MS is the same as in the first embodiment.

Geographical information that can be utilized in deciding changeover rules is as follows:

① Because of the adjacent sea, mobile stations that are present at the wharves (mobile stations located in radio zones C3, C4) are limited to motion that will board them on a ship or motion that will take them back to land.

② A situation in which the present invention is applicable is a case where many mobile stations move in the same way. Ordinarily, boats that make the same kind of movement possible are sightseeing boats or chartered boats, and therefore they will always arrive on land at a location that has been decided.

From these items of information, the following facts can be inferred:

① In FIG. 15, several of the mobile stations among those in radio zones C1, C2, C5 are, geographically speaking, near the shore and in the proximity of wharves, which are man-made structures. Accordingly, that a boat will be utilized can be inferred from the wharves (radio zones C3, C4).

② It is inferred that mobile stations that have entered the wharves (radio zones C3, C4) usually board boats and that they will arrive at a wharf somewhere, geographically speaking. In the case of FIG. 15, the mobile stations go to the island IRL (position registration area PRA5).

③ Furthermore, a mobile station that has entered a wharf will often go to a ticket gate at an approximately fixed time prior to departure of the boat, and the time required also is substantially fixed. Accordingly, the time from arrival at the wharf to landing on shore is substantially fixed.

On the basis of the assumed particulars set forth above, a changeover rule for updating position registration is as shown in FIG. 16. Specifically, a condition to which the changeover rule is applicable is that a mobile station enter radio zones C3, C4 from radio zones C1, C2, C5, as indicated in the rule confirmation portion 2. The changeover rule is such that if the above-mentioned condition holds true, a changeover will be made to position registration area PRA5 in time t21 to t22, as indcted in the changeover rule portion 3. This changeover rule is stored in the rule database RDB (FIG. 1) of the mobile communication control station MSC and notification is given to the mobile station from the base station within position registration area PRA2. The controller 61 of the mobile station and the position registration controller PRC and position registration changeover controller PRS of the mobile communication control station MSC exercise control similar to that of the first embodiment and automatically update the position registration area.

Second Modification

FIG. 17, is a status explanatory view of a rule for updating a position registration area based upon time. The placement of geographical features, man-made structures, position registration areas and radio zones represents a situation different from that of FIG. 3. In FIG. 17, a first ordinary road RDA runs, e.g., in and east-west direction, and a second ordinary road RDB is disposed so as to intersect this ordinary road at right angles. Further, in the direction of arrow B along the ordinary road RDA there are an industrial park and a tourist attraction ahead. A residential area is located near the ordinary road RDB, and the area ahead of this is connected to a principal road from a downtown area. In comparison with the case of the first embodiment of FIG. 3, this arrangement differs only in the changeover rules for updating position registration areas; position registration control in the mobile communication control station MSC and mobile station MS is the same as in the first embodiment.

On the basis of FIG. 17, it can be inferred that many mobile stations will move from the residential area to the industrial park during the commuting hours of weekday mornings. Further, since mobile stations that head for the industrial park will proceed from direction A to direction B, it can be inferred that the mobile stations will turn left at intersection CRS. Since the amount of vehicular traffic is substantially fixed, it can be inferred that the mobile stations will travel at an approximately similar speed every day.

In view of these inferred particulars, a changeover rule for updating position registration during rush hour (7:30 AM to 8:30 AM) on a weekday is as shown in FIG. 18(a). Specifically, a condition to which the changeover rule is applicable is that a mobile station move from radio zone C2 to radio zone C8 taking time tM11 to tM12, as indicated in the rule confirmation portion 2. Further, as indicated in the changeover rule portion 3, the changeover rule is such that ① a changeover be made from position registration area PRA2 to position registration area PRA3 in time t21 to t22, ② from position registration area PRA3 to position registration area PRA4 in time t31 to t32, and ③ from position registration area PRA4 to position registration area PRA5 in time t41 to t42. This changeover rule is stored in the rule database RDB (FIG. 1) of the mobile communication control station MSC and notification is given to the mobile station from the base station within position registration area PRA1 in time period 7:30 AM to 8:30 AM on weekdays. The controller 61 of the mobile station and the position registration controller PRC and position registration changeover controller PRS of the mobile communication control station MSC exercise control similar to that of the first embodiment and automatically update the position registration area.

FIG. 18(b) is a rule for updating a position registration area, in which position registration updating is performed at times other than rush hour on weekdays. The rule has a structure the same as that of (a). Notification is given to the mobile station from a base station within a position registration area PRA1 at times other than rush hour on weekdays and the position registration area is updated automatically in accordance with this rule for updating position registration areas. It should be noted that another rule for updating position registration areas can be prepared in accordance with the time period. Further, another rule for updating position registration areas can also be prepared for Sundays and holidays, and a prescribed rule for updating position registration areas can also be prepared for a season or special date and time.

For example, in a case where a public beach is the tourist attraction in the B direction of FIG. 17, it can be inferred that many mobile stations will travel from downtown to the public beach during the season from the end of July to the beginning of August. Since mobile stations heading for the public beach will proceed from the A direction to the B direction, it is inferred that the mobile stations will turn left at the intersection CRS and, because of road congestion, will travel at substantially the same speed as vehicles in the vicinity. Accordingly, for the beach bathing season (the duration of the summer holidays), a changeover rule for updating position registration areas is prepared for weekdays/Sundays/time period taking the above inferred particulars into consideration.

Further, in a case where a temple at which a well-known festival held on a special data is the tourist attraction, it can be inferred that many mobile stations will travel to the temple from downtown on the day of the festival. Since mobile stations heading for the temple will proceed from the A direction to the B direction, it is inferred that the mobile stations will turn left at the intersection CRS and, because of road congestion, will travel at substantially the same speed 4as vehicles in the vicinity. Accordingly, for this special data, a changeover rule for updating position registration areas is prepared for every time period taking the above inferred particulars into consideration.

(B) Second Embodiment

It can be so arranged that automatic changeover of a position registration area is carried out using schedule information indicating where a mobile station will be present and when based upon a schedule book or business plan.

Figure 19:
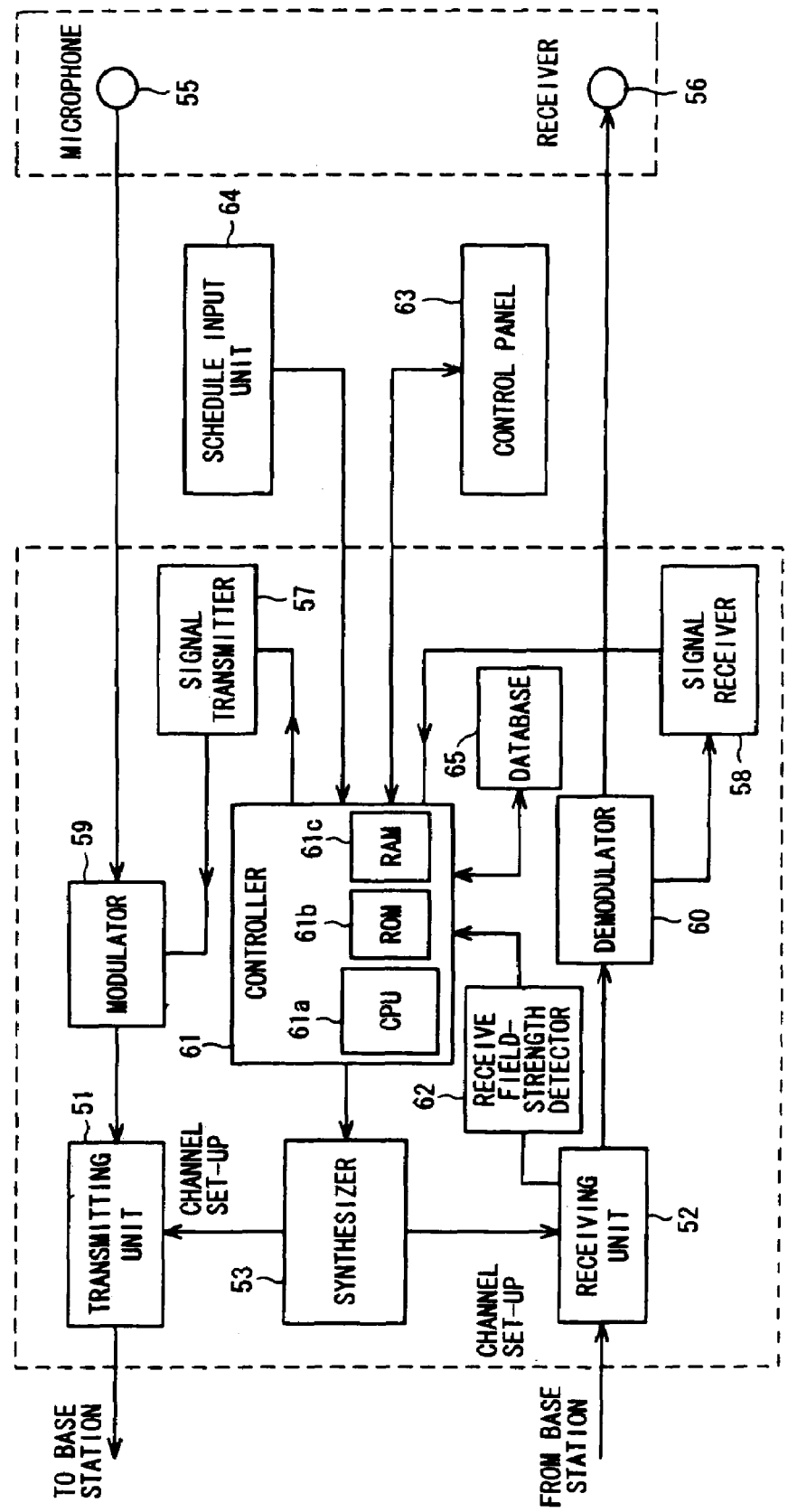
FIG. 19 is block diagram of a mobile station in a case where a position registration area is updated automatically using schedule information.

FIG. 19 is block diagram of a mobile station in a case where a position registration area is updated automatically using schedule information. Components identical with those of the mobile station of the first embodiment are designated by like reference characters. This embodiment differs in that a schedule input unit 64 and a database 65 that stores conversion data for converting a location/facility to a radio zone number are provided. Data for converting a location/facility to a radio zone ID has been stored in the database 65, as shown in FIG. 20.

Schedule information as to where the owner of a mobile station will be located and when, as shown in FIG. 21, is entered from the schedule input unit 64. Using the database, the controller 61 converts the schedule information to information having a format identical with that of position information (a radio zone number) reported from a base station, as shown in FIG. 22, and stores the information in the data memory 61c.

The mobile communication control station MSC on the network side has a structure identical with that of the first embodiment (FIG. 1), and rules for updating a position registration area shown in FIG. 23 have been stored in the rule database RDB of the mobile communication control station. In the rules for updating a position registration area in FIG. 23, the changeover rule portion 3 stipulates the minimum and maximum times of the timing at which a plurality of intersections present along a path between any two points are passed. It is preferred that each intersection reside in a respective one of a plurality of position registration areas present along the path. Leading latitude and longitude positions (e1-n1, e7-n7) indicate the starting-point intersections, and trailing latitude and longitude positions (e6-n6, e12-n12) indicate the target intersections. The position registration controller PRC uses the conversion table shown in FIG. 24 to convert the latitude-longitude information in the rules for updating the position registration area to radio zone/position registration area numbers, as shown in FIG. 25, and reports these numbers to the mobile station from the base station.

Figure 26:
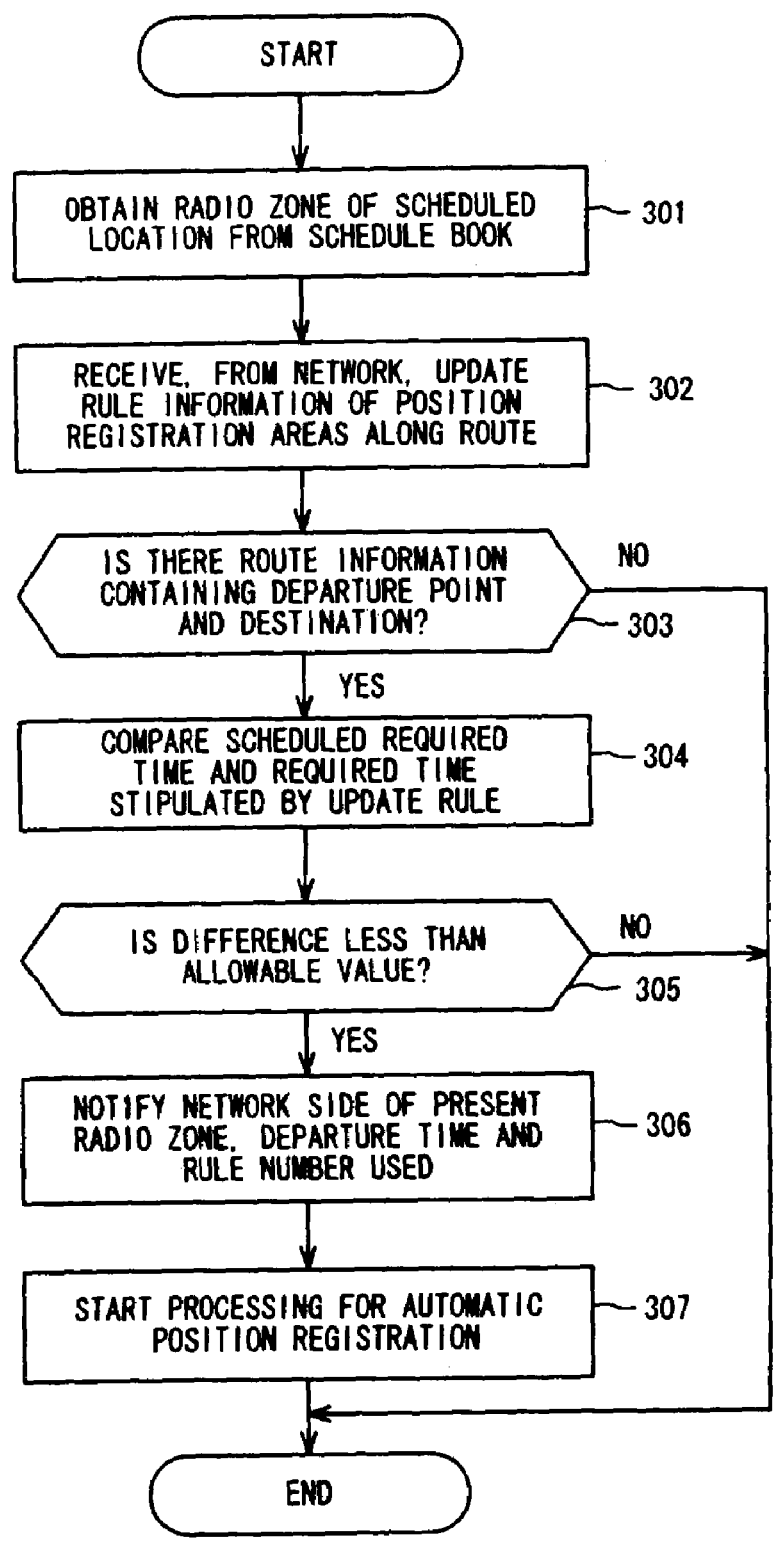
FIG. 26 is a flowchart of processing by a mobile station in a case where a position registration area is updated automatically using schedule information.

FIG. 26 is a flowchart of processing by a mobile station in a case where a position registration area is updated automatically using schedule information. The controller 61 of the mobile station extracts the departure point (present location) and destination from the schedule book (FIG. 21) and obtains the radio zone (FIG. 22) (step 301). Further, the controller receives, from the network side, a plurality of rules (FIG. 25), which are for updating the position registration area, obtained by converting the latitude-longitude information to radio zone numbers/position registration area numbers (step 302). The controller 61 checks to determine whether each rule for updating the position registration area reported from the network side contains a departure radio zone and a destination radio zone (step 303). If it does not, the controller concludes that the rule for updating the position registration area is not applicable and ends processing. However, in a case where a rule for updating the position registration area containing a departure radio zone and a destination radio zone exists, the controller compares a scheduled required time for travel from the departure point to the destination obtained from the schedule information with a required time stipulated by the rule for updating the position registration area (step 304) and checks to determine whether the difference between the two times is less than an allowable value (step 305). If the difference is equal to or greater than the allowable value, the controller concludes that the rule for updating the position registration area is not applicable and ends processing. However, if the difference is less than the allowable value, the controller concludes that the changeover rule is applicable and notifies the mobile communication control station MSC on the network side of the departure radio zone, departure time and rule number used (step 306). The controller subsequently starts processing for automatic position registration in a manner similar to that of the first embodiment (step 307). Further, the mobile communication control station MSC also executes processing for updating the position registration area in accordance with the rule (changeover timing) for updating of the position registration area having the rule number that has been reported.

(C) Third Embodiment

It can be so arranged that automatic changeover of a position registration area is carried out using position information and required-time information that enters from a navigation system. Specifically, a navigation system has a function whereby when a destination is input thereto, searches for the optimum course in accordance with traffic-congestion information and computes the required time. Utilizing this function, a mobile station acquires, from the navigation system, position information (latitude-longitude information) of main intersections on the scheduled path and required time that takes traffic-congestion information into consideration and uses this information to perform automatic changeover of the position registration area.

Figure 27:
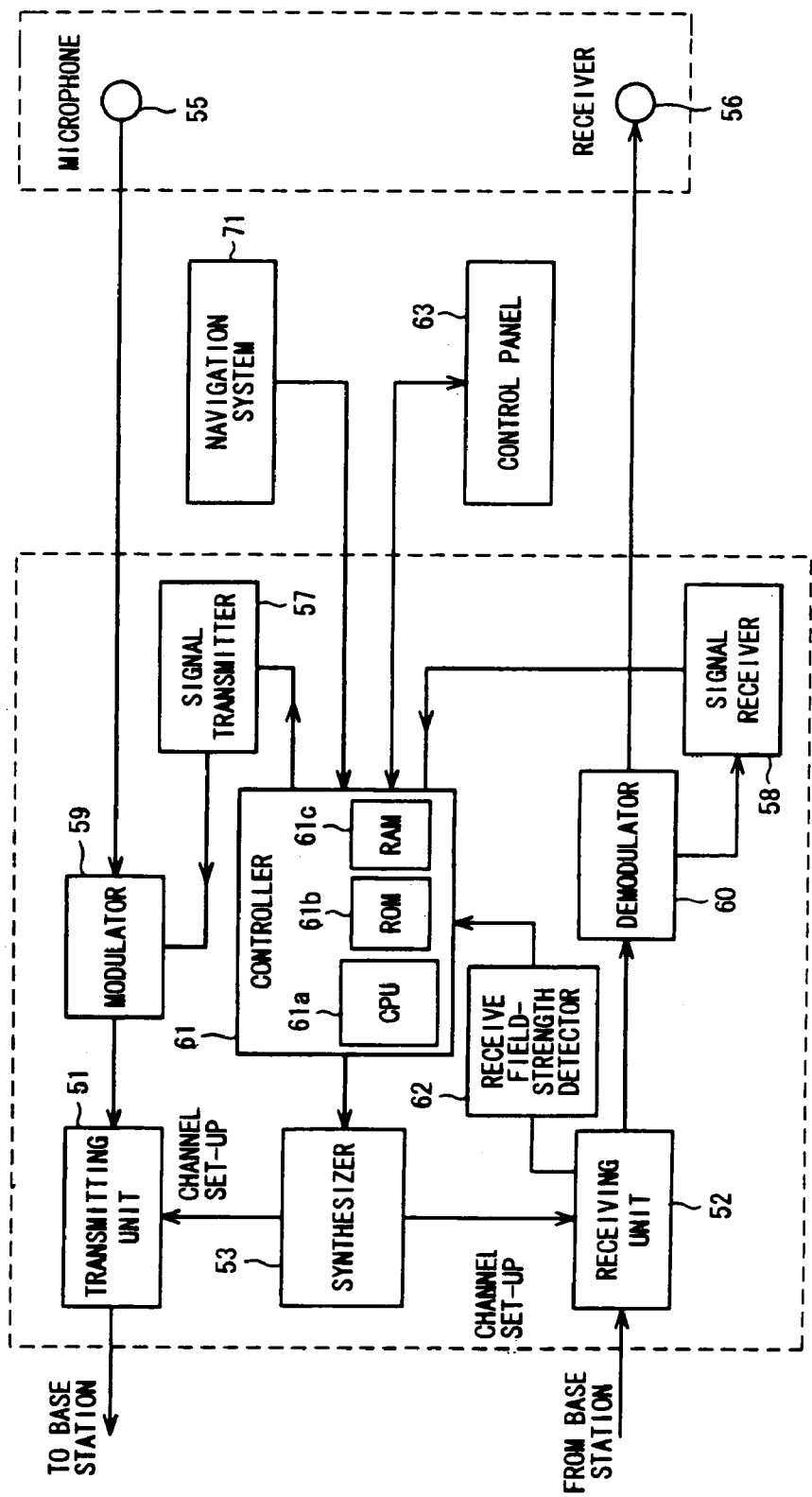
FIG. 27 is a block diagram of a mobile station in a case where a position registration area is changed over automatically using information obtained from a navigation system.

FIG. 27 is a block diagram of a mobile station in a case where a position registration area is changed over automatically using information obtained from a navigation system. Components identical with those of the mobile station of the first embodiment are designated by like reference characters. This embodiment differs in that a navigation system 27 is provided.

The mobile communication control station MSC on the network side has a structure identical with that of the first embodiment, and rules for updating a position registration area shown in FIG. 23 have been stored in the rule database RDB of the mobile communication control station.

FIG. 28 is a flowchart of processing by a mobile station in a case where a position registration area is updated automatically using navigation information. From the monitoring controller 71 the controller 61 of the mobile station acquires a route and required time for travel from the present location to the destination (step 401). Further, the controller receives, from the network side, a plurality of rules (FIG. 23), which are for updating the position registration area (step 402). The controller 61 checks to determine whether the rules for updating of the position registration area reported from the network side have an updating rule that contains latitude-longitude information of a departure point, thru-point and destination obtained from the navigation system (step 403). If such a rule is absent, the controller concludes that the rule for updating the position registration area is not applicable and ends processing. However, in a case where a rule for updating the position registration area containing latitude-longitude information of a departure point, thru-point and destination exists, the controller compares required time obtained from the navigation system with a required time stipulated by the rule for updating the position registration area (step 404) and checks to determine whether the difference between the two times is less than an allowable value (step 405). If the difference is equal to or greater than the allowable value, the controller concludes that the rule for updating the position registration area is not applicable and ends processing. However, if the difference is less than the allowable value, the controller concludes that the rule for updating the position registration area is applicable and notifies the mobile communication control station MSC on the network side of the present location, destination, departure time and rule number used (step 406). The controller subsequently starts processing for automatic position registration in a manner similar to that of the first embodiment (step 407). Further, the mobile communication control station MSC also executes processing for updating the position registration area in accordance with the rule (changeover timing) for updating of the position registration area having the rule number that has been reported.

By virtue of the above operation, a rule is found that stipulates the timings at which a mobile station passes various points in position registration areas that exist along a route the same as a route obtained from a navigation system, and the position registration area of the mobile station can be updated based upon rule found. In this case, if the mobile communication control station MSC acquires traffic information periodically and updates the rule database RDB, greater effects are obtained.

Modification

The foregoing relates to a case where a position registration area is updated automatically using information that has been acquired form a navigation system. However, it is also possible to update a position registration area automatically in accordance with ① to ③ below using Web content.

① If a Website having a function similar to that of a navigation system exists, information similar to that acquired from a navigation system is acquired from the Website and automatic updating is performed by control similar to control in the case of the navigation system.

② Further, there is a Website having a function whereby if present time, departure time, desired arrival time, departure point and destination are input, a route, which includes transit-system connecting information up to the destination, as well as time required for travel up to principal points on the route and arrival time, is acquired, and the times and required times are displayed. In such case, stations where connections are made, bus stops where connections are made, stations along the way, bus stops along the way, lines where vehicles are boarded and times required to reach these points are input from the Website to the mobile station as route information. The mobile station has a conversion table for converting position information of principal stations and bus stops, etc., into radio zone numbers. By using this conversion table, the mobile station converts stations where connections are made, bus stops where connections are made, stations along the way and bus stops along the way to radio zone numbers and then performs changeover automatically by control similar to control in the case of the schedule function.

③ There are cases where train ticket and airline tickets, etc., are reserved and purchased utilizing the Web. The mobile station acquires the departure point, arrival point, name of the train, departure time and arrival time from the Web, refers to the mobile-station database, etc., based upon the departure point, arrival point and train name, makes a conversion to information representing positions (radio zones) that will be passed and then performs changeover automatically by control similar to control in the case of the schedule function.

(D) Miscellaneous (a) Example of Rule Database Structure

When rules of a plurality of different formats for updating a position registration area can be defined, a rule format number is introduced, as shown in FIG. 29, and the rule format number and rule number are reported to the network side when a mobile station registers its position. In FIG. 29, rule data of rule format number 1 is that used in the first embodiment, and a rule format number 2 is that used in the second and third embodiments.

Figure 30:
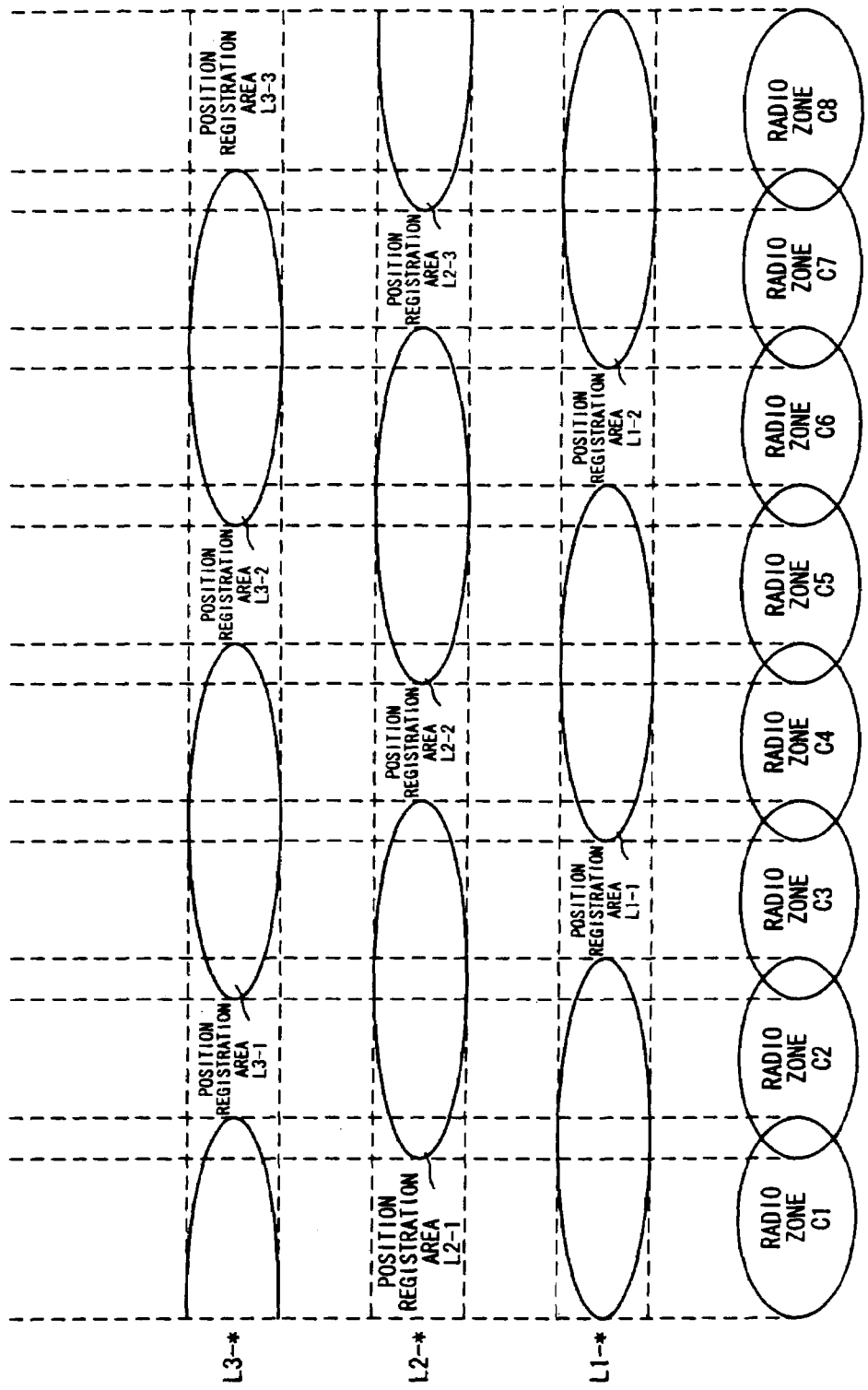
FIG. 30 is an explanatory view for a case where multiple series of position registration areas exist in one radio zone.

(b) Rule for updating position registration area in case where multiple series of position registration areas exist in one radio zone ① When multiple position registration areas of identical size exist in one radio zone There are cases where a plurality of position registration areas of the same size exist in a single radio zone in order to notify of position registration in dispersed fashion, as shown in FIG. 30. In such case, it can be so arranged that in which of position registration area series L1-*, L2-*, L3-* a mobile station belongs can be identified by a number that has been written to the mobile station in advance. If this arrangement is adopted, the mobile station is capable of recognizing, from the number, the position registration area series in which it belongs, and therefore it will suffice to apply only the rule of the position registration area series in which the mobile station belongs. For example, if rules of FIGS. 31(*a*), (*b*) have been reported in radio zone C5 of FIG. 30, a mobile station that belongs in series L1-* applies the rule of rule number 1 and a mobile station that belongs in series L2-* applies the rule of rule number 2.

Figure 32:
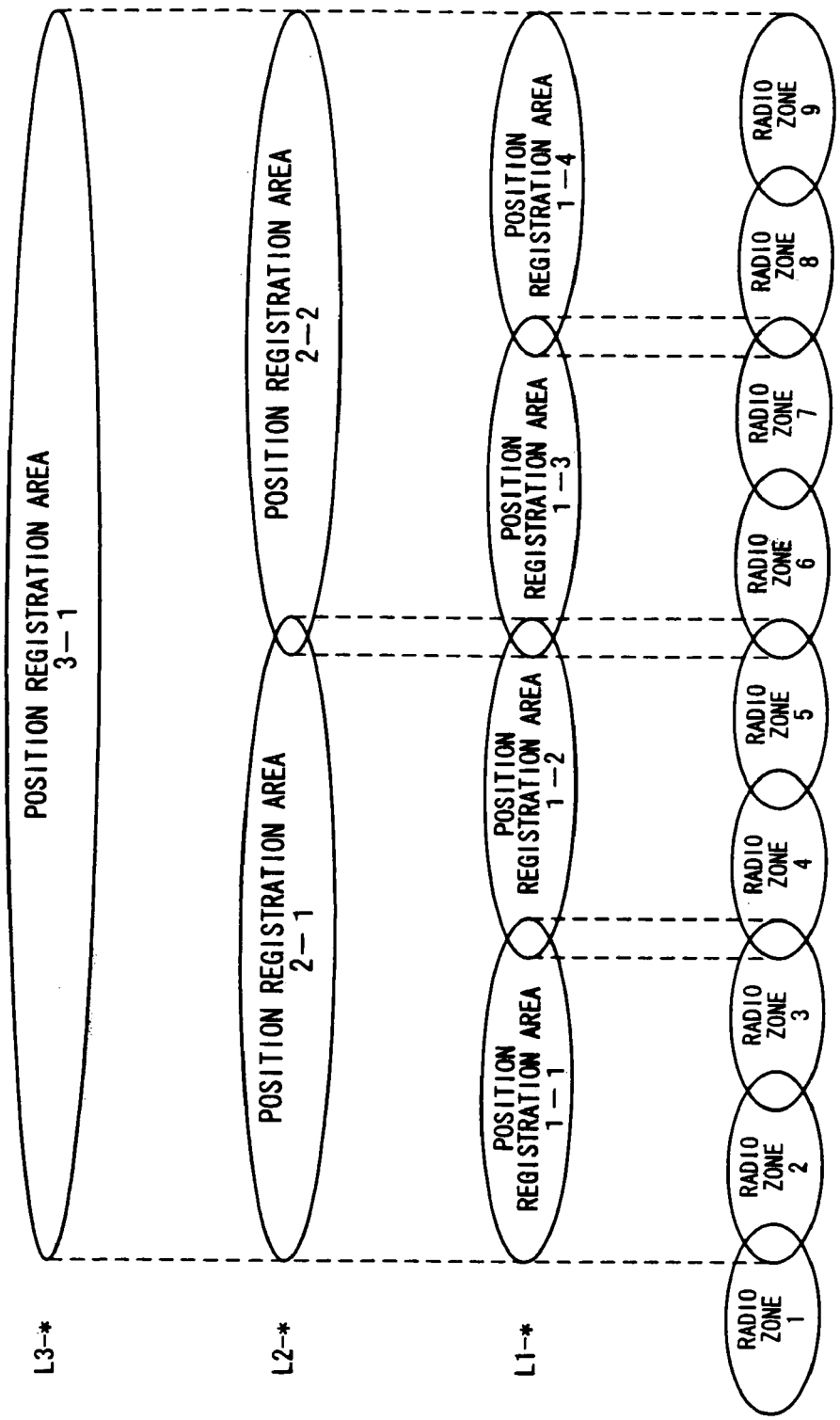
FIG. 32 is another explanatory view for a case where multiple series of position registration areas exist in one radio zone.
Figure 35:
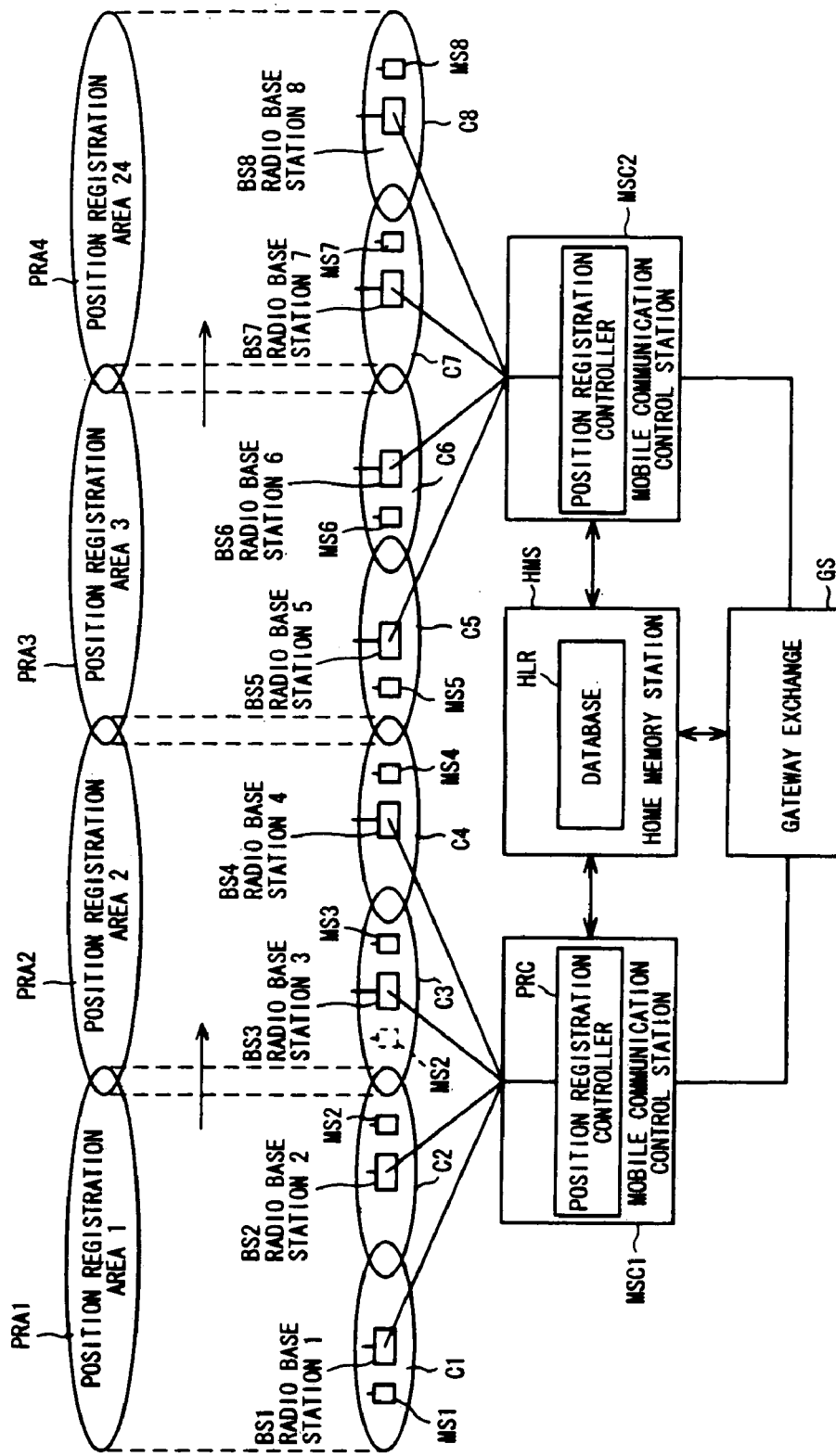
FIG. 35 is a diagram of the configuration of a mobile radio system according to the prior art.
Figure 36:
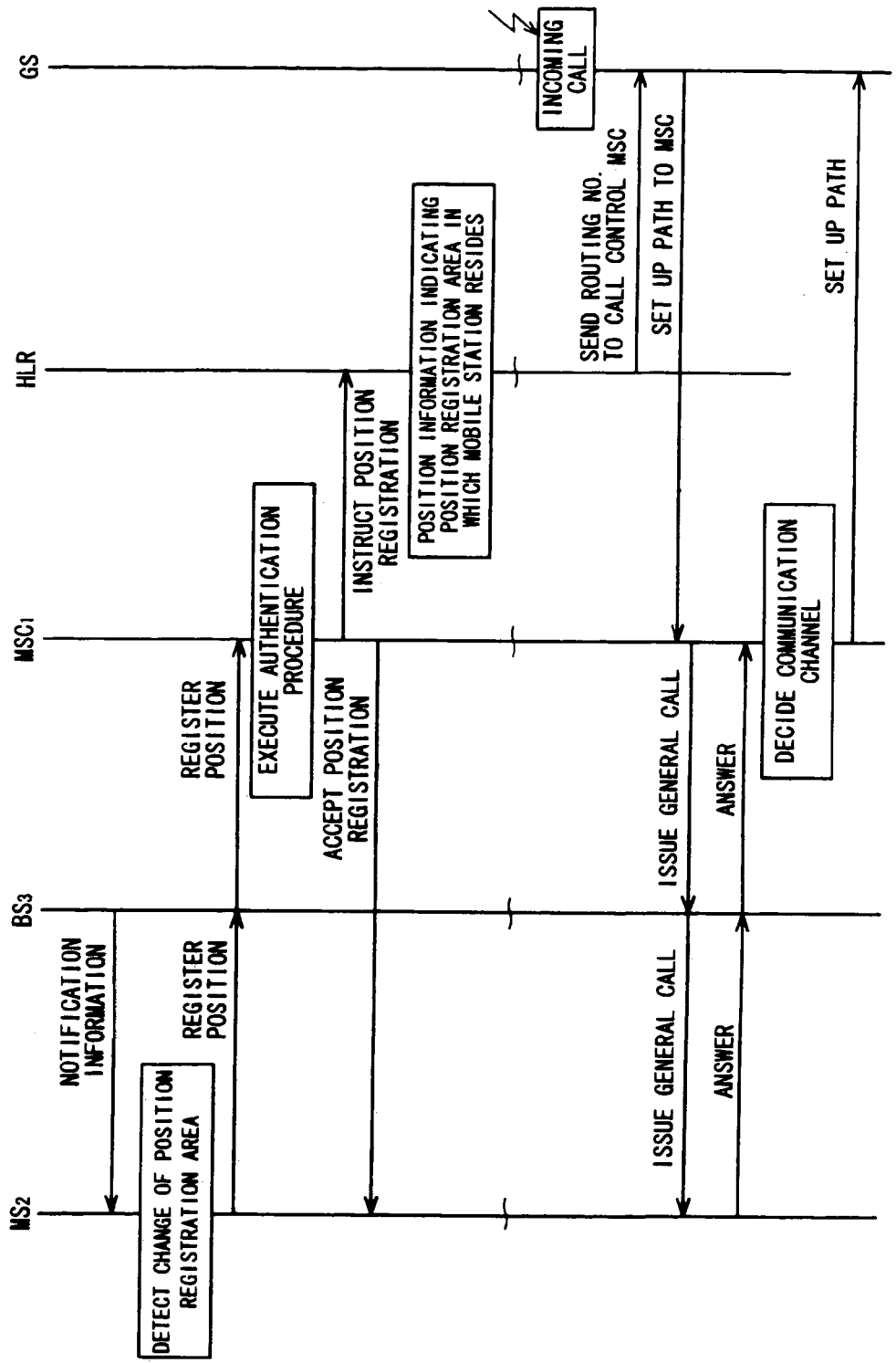
FIG. 36 is a diagram useful in describing an overview of a position registration and call terminating procedure in mobile radio communication.
Figure 37:
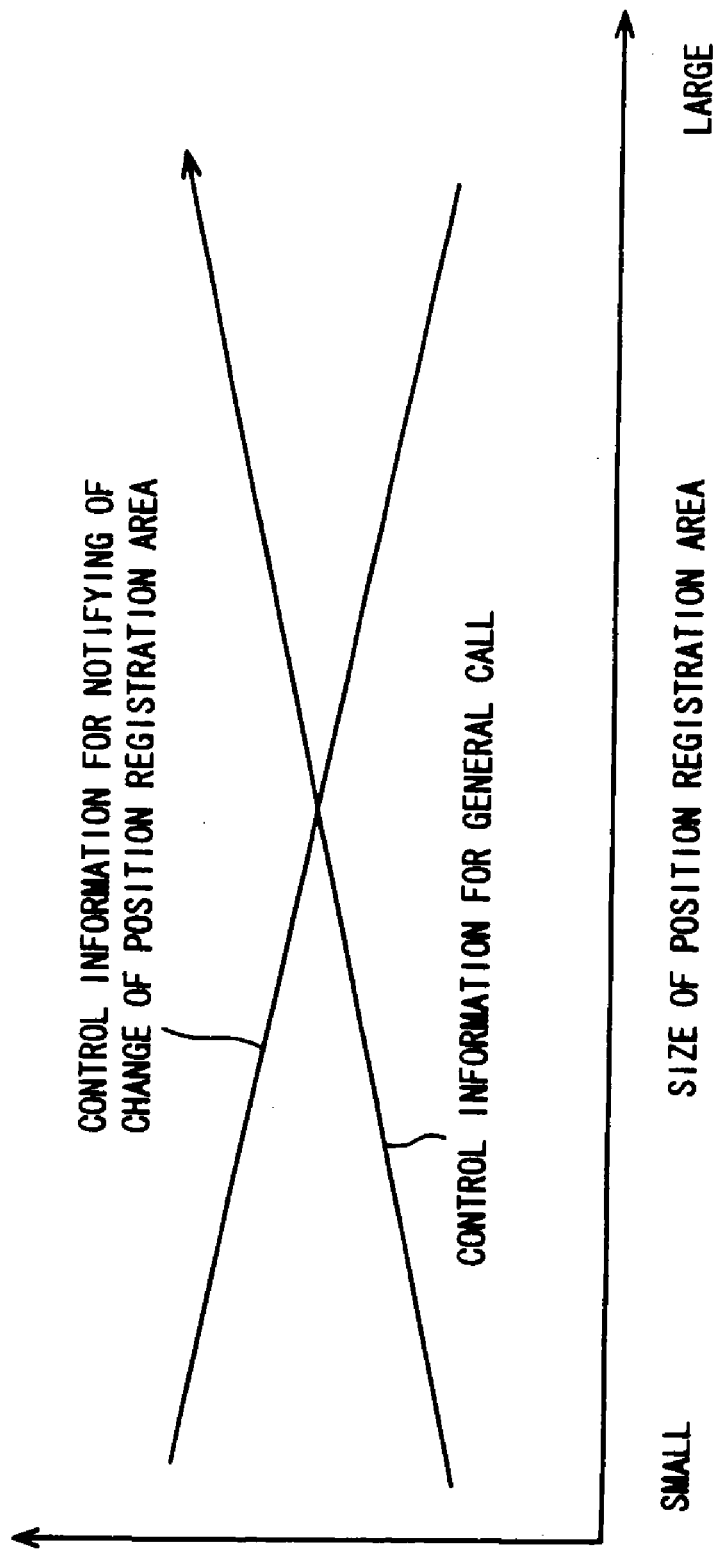
FIG. 37 is an explanatory view illustrating the relationship between the size of a position registration area and amount of control information.
Figure 38:
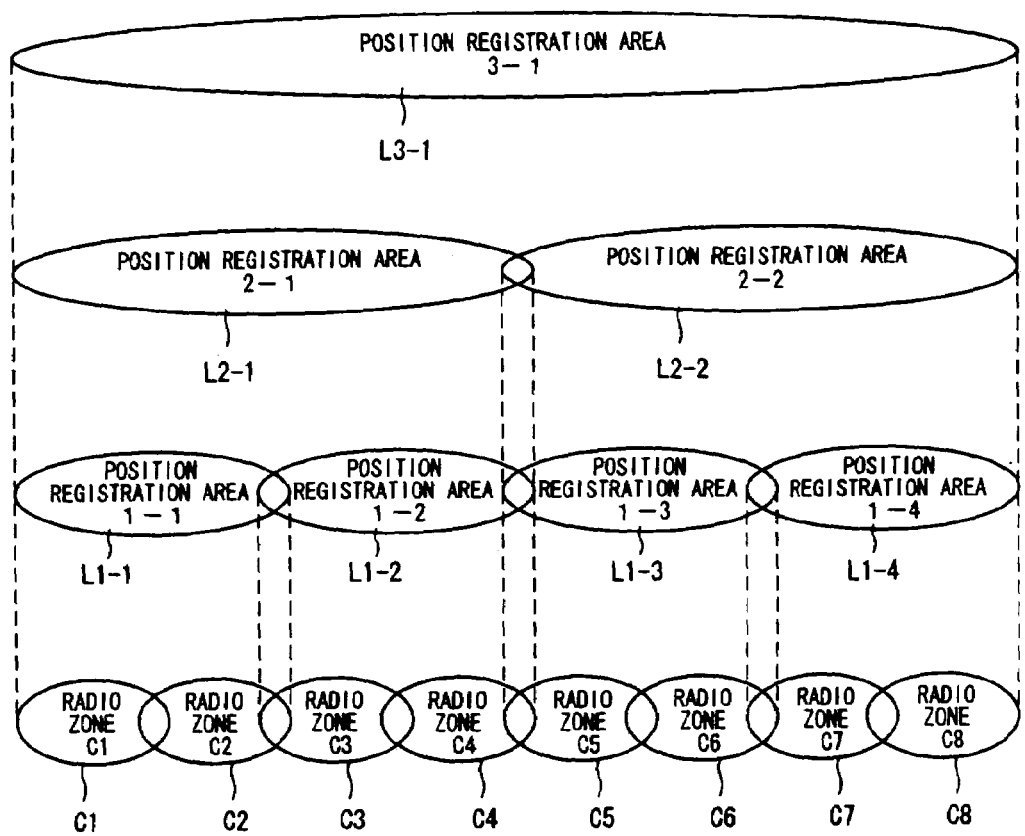
FIG. 38 is a diagram illustrating position registration areas of a mobile telephone system according to the prior art.

② When multiple position registration areas of different sizes exist in one radio zone In a case where a plurality of position registration areas of different sizes exist in a single radio zone, as depicted in FIG. 32, position registration area series L1-*, L2-*, L3-* to which a mobile station belongs are decided based upon the travelling speed of the mobile station. For example, in a case where travelling speed is measured in terms of the frequency at which the position registration area is changed over, the mobile station changes over the position registration area series based upon the measured changeover frequency and changeover-frequency notification information illustrated in FIG. 33.

When the mobile station moves into radio zone C1, the rules of FIG. 34(*a*) for updating the position registration area sent from a base station are stored, elapsed time is subsequently measured and it is determined whether elapsed time that prevails when the mobile station has moved into radio zone C2 satisfies any of the conditions of rule confirmation portions 2 of rule numbers 1, 2, 3. The rule for updating the position registration area having the rule number that satisfies the condition is adopted and this rule number is reported to the mobile communication control station MSC along with position registration information. As a result, as long as a change in speed to a degree that changes over a position registration area series does not occur subsequently, the mobile station and the mobile communication control station can change over the position registration area together in accordance with the rule for updating the position registration area having the rule number of the adopted series.

In a case where the mobile station moves into radio zone C2, the rules of FIG. 34(*b*) for updating the position registration area sent from a base station are stored, elapsed time is subsequently measured and it is determined whether elapsed time that prevails when the mobile station has moved into radio zone C3 satisfies any of the conditions of rule confirmation portions 2 of rule numbers 1, 2, 3. The rule for updating the position registration area having the rule number that satisfies the condition is adopted and this rule number is reported to the mobile communication control station MSC along with position registration information. The mobile station and the mobile communication control station thenceforth change over the position registration area together in accordance with the rule for updating the position registration area having the rule number of the newly adopted series.

Effects

Thus, in accordance with the present invention, the motion of a mobile station is assumed and both a mobile communication control station and the mobile station change over a position registration area based upon a common rule, thereby eliminating the need to give notification of position registration indicative of the fact that the position registration area has changed. As a result, it is possible to reduce the quantity of signals for control information in the overall system and to achieve an attendant reduction in the power consumption of the mobile station.

What is claimed is:

1. A method of registering position in a mobile radio communication system in which a position registration area number is reported from a base station to a mobile station within a radio zone, position information indicating a position registration area in which a mobile station resides is registered in storage means based upon position registration information that has been transmitted from the mobile station, and when there is an incoming call to a mobile station, a paging call is placed from a plurality of base stations within the position registration area, in which said base station resides, based upon position information that has been read out of said memory means, comprising steps of:

registering a rule for predicting the timing when a mobile station changes a position registration area by moving;

checking, on a per-mobile-station basis, whether a state in which said rule is applicable has been attained; and updating the position registration area of said mobile station based upon said rule if the state in which the rule is applicable has been attained.

2. A method of registering position according to claim 1 wherein said rule is reported from a base station to a mobile station upon being incorporated in notification information transmitted from a network side, and said mobile station halts transmission of position registration information if the state in which said rule is applicable is attained.

3. A method of registering position according to claim 2, wherein when a position registration area that has been assumed based upon said rule and a position registration area of which notification has been given from the network side agree a predetermined number of times, said mobile station judges that a state in which said rule is applicable has been attained and halts transmission of position registration information.

4. A method of registering position according to claim 2, wherein if a position registration area that has been assumed based upon said rule differs from a position registration area of which notification has been given from the network side, said mobile station notifies the network side of position registration information.

5. A method of registering position according to claim 4, wherein correcting the timing in said rule based upon a plurality of the notifications transmuted from a mobile station at such time that a position registration area assumed based upon said rule differs from a position registration area reported from the network side.

6. A method of registering position according to claim 2, characterized by:
when a plurality of position registration area series composed of different combinations of radio zones under control exist, notifying a mobile station of information for deciding on the basis of which rule of a position registration area series a position registration area is to be assumed; and
assuming a position registration area in accordance with the rule of a prescribed position registration area series based upon said information.

7. A method of registering position according to claim 1 wherein a rule for updating said position registration area is decided taking into consideration one or more items selected from among placement of man-made structures, natural geographical features, present location of a mobile station, history of movement, traveling speed, time, season, date, day of the week, schedule information indicating the schedule of the owner of the mobile station and navigation information.

8. A method of registering position according to claim 1, wherein further comprising:
stipulating, by said rule, timing at which each point within a position registration area present along a route between any two points is passed;
acquiring a departure point and a destination from schedule information;
modifying said rule so as to stipulate timing at which each point present along a route connecting the departure point and the destination is passed; and
updating a position registration area of a mobile station based upon the rule modified.

9. A method of registering position according to claim 1, wherein further comprising:
stipulating, by said rule, timing at which each point within a position registration area present along a route connecting any two points is passed;
acquiring, from a navigation system, a route from a present position to a destination;
modifying said rule so as to stipulate timing at which each point present along said route obtained from the navigation system is passed; and
updating a position registration area of a mobile station based upon the rule modified.

10. A mobile radio communication system in which a position registration area number is reported from a base station to a mobile station within a radio zone, position information indicating a position registration area in which a mobile station resides is based upon position registration information that has been transmitted from the mobile station, and when there is an incoming call to a mobile station, a paging call is placed from a plurality of base stations within the position registration area, in which said base station resides, based said position information, comprising:
means for storing a rule for predicting the timing when a mobile station changes a position registration area by moving;
storage means for storing position information indicating a position registration area in which a mobile station resides; and
a position registration controller for obtaining a position registration area of a mobile station based upon said rule if a state in which said rule is applicable has been attained on a per-mobile-station basis, and updating said position information.

11. A mobile station in a mobile radio communication system in which a position registration area number is reported from a base station to a mobile station within a radio zone, position information indicating a position registration area in which a mobile station resides is based upon position registration information that has been transmitted from the mobile station, and when there is an incoming call to a mobile station, a paging call is placed from a plurality of base stations within the position registration area, in which said base station resides, based said position information, comprising:
means for receiving and storing a rule, in accordance with which a position registration area is changed by movement, from a network side; and
position registration control means for checking whether a state in which said rule is applicable has been attained and halting transmission of position registration information if the state in which the rule is applicable has been attained.

12. A mobile station according to claim 11, wherein when a position registration area that has been assumed based upon said rule and a position registration area of which notification has been given from the network side agree a predetermined number of times, said position registration control means judges that a state in which said rule is applicable has been attained and halts transmission of position registration information.

13. A mobile station according to claim 11, wherein if a position registration area that has been assumed based upon said rule differs from a position registration area of which notification has been given from the network side, said position registration control means reports position registration information to the network side.

* * * * *